United States Patent [19]

Kondo et al.

[11] Patent Number: 5,331,154
[45] Date of Patent: Jul. 19, 1994

[54] ROTARY ENCODER FOR DETECTING A ROTATING POSITION OF A MOTOR

[75] Inventors: Kenichi Kondo; Shigeo Yamagata; Yuji Sakaegi; Toshihiko Kudo; Kazuhiro Matsunaga; Tsutomu Takayama, all of Kanagawa, Japan

[73] Assignee: Canon Kabushiki Kaisha, Tokyo, Japan

[21] Appl. No.: 943,764

[22] Filed: Sep. 11, 1992

Related U.S. Application Data

[62] Division of Ser. No. 441,718, Nov. 27, 1989, Pat. No. 5,168,364.

[30] Foreign Application Priority Data

| Nov. 30, 1988 | [JP] | Japan | 63-300839 |
| Nov. 30, 1988 | [JP] | Japan | 63-300840 |
| Nov. 30, 1988 | [JP] | Japan | 63-300842 |
| Nov. 30, 1988 | [JP] | Japan | 63-300848 |
| Dec. 14, 1988 | [JP] | Japan | 63-316760 |

[51] Int. Cl.$^5$ .............................................. G01D 5/34
[52] U.S. Cl. ............................. 250/231.17; 250/231.14
[58] Field of Search .................. 250/231.17, 231.18, 250/231.14, 237 G; 33/707; 341/13, 14; 324/175; 356/373-375

[56] References Cited

U.S. PATENT DOCUMENTS

| 2,901,170 | 8/1959 | Poole | 250/231.17 |
| 4,866,268 | 9/1989 | Tang et al. | 250/231.18 |
| 4,866,269 | 9/1989 | Wlodarczyk et al. | 250/231.18 |
| 4,972,078 | 11/1990 | Hasebe et al. | 250/231.14 |
| 5,021,735 | 6/1991 | Maass et al. | 250/231.18 |

FOREIGN PATENT DOCUMENTS 0168914 10/1983 Japan .............................. 250/231.17

Primary Examiner—David C. Nelms
Attorney, Agent, or Firm—Robin, Blecker, Daley & Driscoll

[57] ABSTRACT

In an image sensing apparatus having a solid-state image sensor provided with an antiblooming gate and an electronic flash device, a clock signal generating circuit is arranged to apply to the gate a clock signal at a given frequency during the flashing period of the flash device and at a lower frequency than the given frequency during a period immediately before the flashing period and a period after completion of flashing by the flash device. The device includes a rotary encloder with light transmitting, blocking and semi-transmitting sections. The position of the encoder is used in an exposure means for controlling an exposure condition of a photo-converting member.

7 Claims, 16 Drawing Sheets

FIG.6
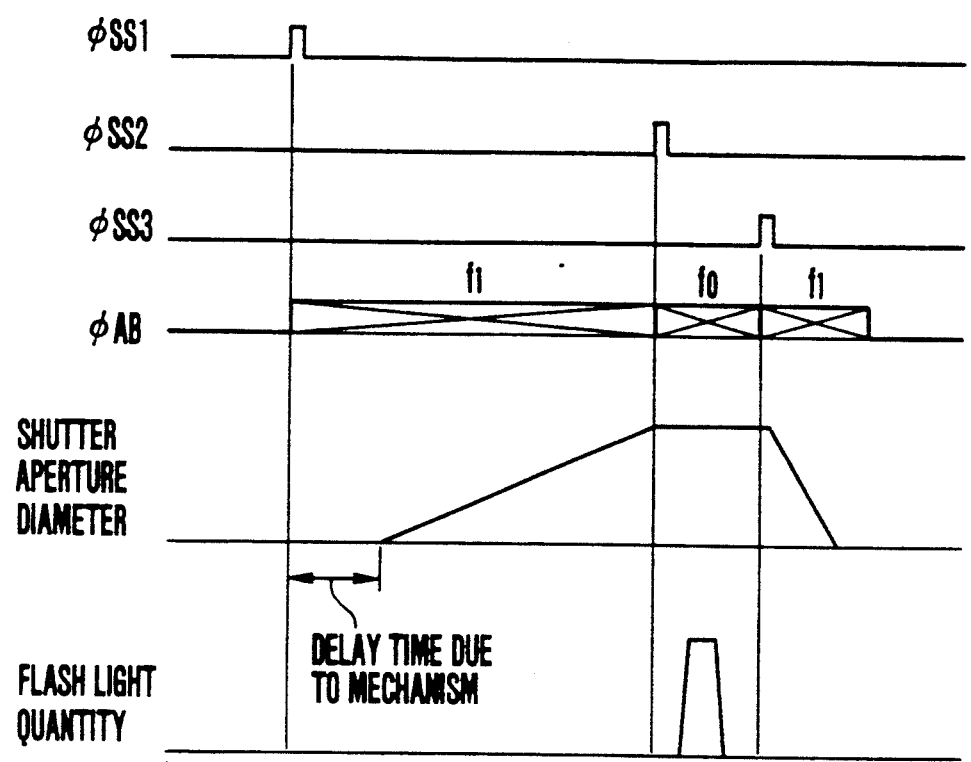
FIG.7(a)
FIG.7(b)
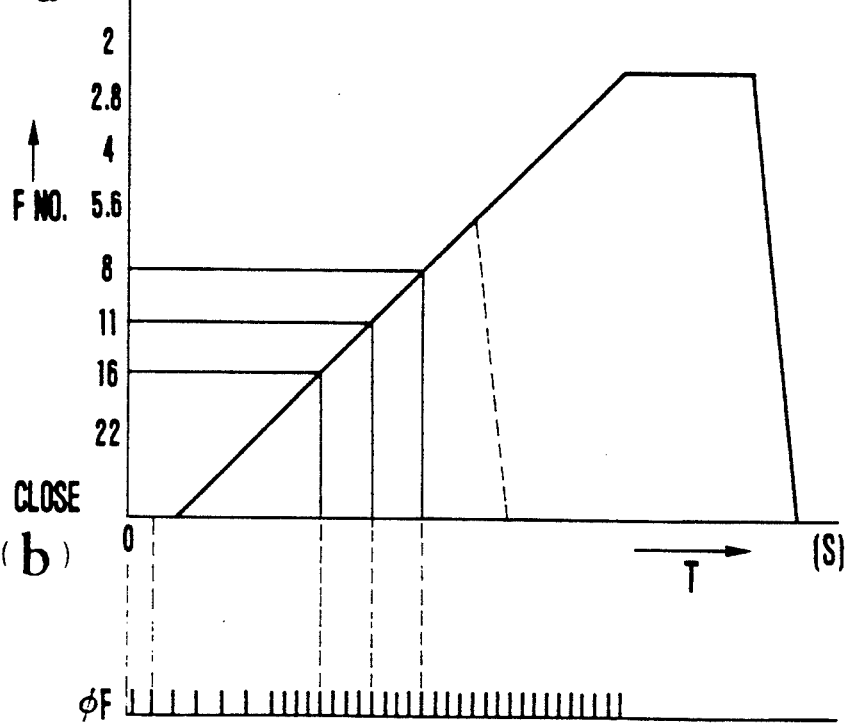

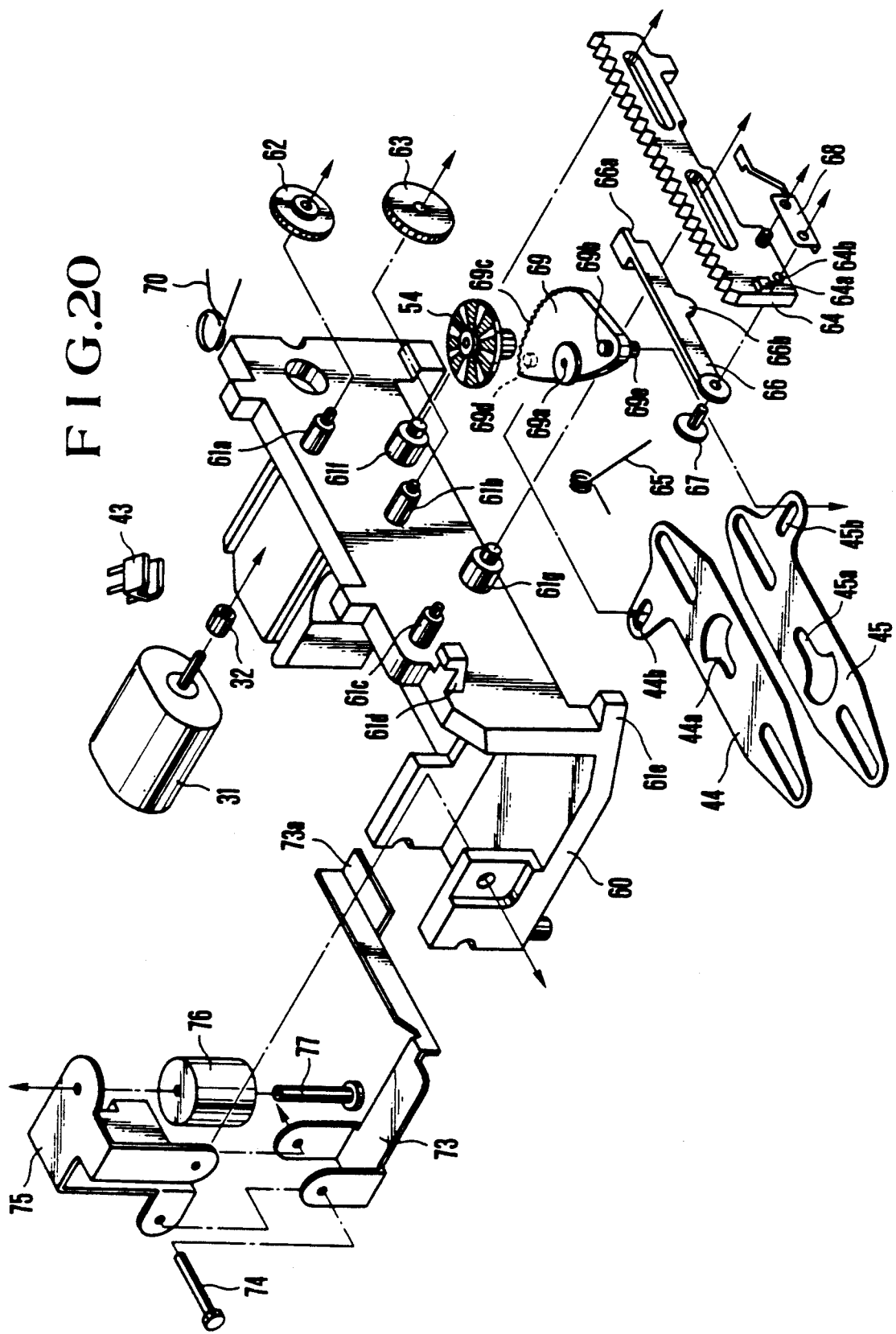

ROTARY ENCODER FOR DETECTING A ROTATING POSITION OF A MOTOR

This application is a division of application Ser. No. 441,718, filed Nov. 27, 1989 now patented (U.S. Pat. No. 5,168,364).

BACKGROUND OF THE INVENTION

1. Field of the Invention

This invention relates to an image sensing apparatus which uses an electronic flash device.

2. Description of the Related Art

Image sensing apparatuses arranged to record still pictures of photographing objects have recently come to be used either as electronic still video cameras or for industrial purposes. The camera of this kind employs a solid-state image sensor as an image sensing device to meet such requirements as a compact size, a light weight and a high reliability.

The solid-state image sensor, however, has a disadvantage which lies in a phenomenon called blooming. This phenomenon takes place as follows: When a part of an image sensing area receives incident light of strong intensity, the amount of electric charge generated there exceeds the charge accumulating capacity of the picture elements of the part and overflows into an adjacent part having a less quantity of incident light. This results in a false signal. In a known method for preventing this, picture elements are provided with an antiblooming gate for removal of excessive electric charge caused by electron-hole recombination. The solid-state image sensor which is arranged in this manner includes a frame-transfer type virtual phase CCD (charge-coupled device) which has the antiblooming gate arranged to discharge unnecessary electric charge. The mechanism of the antiblooming gate is as described below:

FIG. 1(a) of the accompanying drawings is a sectional view taken in the direction of transfer showing the virtual phase CCD having the antiblooming gate. Each picture element consists of one transfer gate area and one virtual phase area. The antiblooming gate 1 is disposed in an intermediate position between a virtual barrier and a virtual well within the virtual phase area. The illustration includes a transfer gate electrode 2; an N type impurity layer 3; and a P+ impurity layer 4. FIG. 1(b) shows potential distribution obtained in an electric charge accumulating mode. A clock signal of an arbitrary frequency is applied to the antiblooming gate 1.

FIG. 2 shows distribution of potential obtained in the direction of depth below the antiblooming gate 1. The distribution is obtained when a high level voltage is applied to the antiblooming gate 1. Under this condition, an electric charge signal which is an electric charge generated by photoelectric conversion in the electric charge accumulating mode comes to overflow an interface when it exceeds a capacity determined by a surface potential and the maximum value of a channel potential. The overflowing electric charge is then trapped on a surface level. Then, if the potential level of the antiblooming gate 1 is lowered in such a way as to obtained a pinning state, the surface is filled with holes with the P+ layer 4 of the channel stop area and that of the virtual gate area serving as supply sources. Under this condition, the electrons are recombined with holes on the surface level. The blooming which results from an excess of electric charge can be prevented with this action repeated during the process of accumulating the electric charge.

FIG. 3 shows the arrangement of the conventional electronic still video camera. The illustration includes a lens 11; a half-opening type shutter 12; a solid-state image sensor 13 which is a CCD or the like having the above-stated antiblooming gate; a driving circuit 16 which is arranged to generate a gate pulse for the solid-state image sensor 13; a light measuring circuit 14 which is provided for determining an apposite exposure; a color measuring circuit 15 for determining white balance; a system control circuit 17 which is arranged to generate timing pulses and control signals for the operation of the whole camera; an image signal processing circuit 18 which is arranged to create, from the signal output from the solid-state image sensor 13, color difference signals (R-Y and B-Y) and a luminance signal with a synchronizing signal (Y+Sync); a modulation circuit 19 which frequency-modulates the signals output from the image signal processing circuit 18; a recording amplifier 20 which amplifies the signal output from the modulation circuit 19; a magnetic head 21 which electromagnetically converts the signal output from the recording amplifier 20; a magnetic sheet (or disc) 22 on which magnetic signals are recorded by the magnetic head 21; a motor 23 which rotates the magnetic sheet 22; a servo circuit 24 which controls the rotation of the motor 23; and an electronic flash device 25 (hereinafter referred to as a flash device) which is used for illuminating an object to be photographed and is either incorporated within the camera or removably mounted on the camera. FIG. 4 is a timing chart showing the operation of the electronic still video camera of FIG. 3 performed for flash photography.

Referring to FIG. 4 along with FIG. 3, the conventional electronic still video camera performs a flash photographing operation in a manner as described below:

A pulse $\phi SS1$ is produced as an instruction for opening the half-opening type shutter 12. In response to this instruction, the shutter 12 begins to operate. After the lapse of the delay time of an electrical signal due to a mechanical arrangement, the shutter 12 begins to open to give a desired aperture diameter. A clock signal $\phi AB$ of a frequency f0 Hz which prevents occurrence of blooming in an object's image due to the flash light of the flash device at the time of flashing of the flash device is applied to the antiblooming gate 1 either at the same time as the generation of the pulse $\phi SS1$ or after the lapse of the estimated delay time of the shutter 12. A pulse $\phi SS2$ is generated the instance the opening of the shutter 12 reaches the desired aperture diameter. In response to the pulse $\phi SS2$, the shutter 12 is stopped from opening and is kept in the aperture position. The instant the aperture of the shutter 12 is stopped at the desired aperture diameter position, the flash device 25 is instructed to flash. In response to this, the flash device 25 flashes at a flashing time of at least 1/1000 sec.. After flashing, a pulse $\phi SS3$ which is an instruction for closing is applied to the shutter 12. The shutter 12 begins to close. After closing of the shutter 12, the accumulated electric charge of the solid-state image sensor 13 is read out to be subjected to a signal processing action. A signal thus obtained is modulated, amplified and then recorded on the magnetic sheet 22.

In accordance with the conventional arrangement, however, the attempt to obtain a sufficient antiblooming capability results in an extremely high degree of dark current, which degrades the picture quality.

The details of this are as follows: The antiblooming gate operates in the manner as described above. The surface pinning process of the operation is followed by a process during which holes are coming back to the channel stop area and the virtual gate area of the P+ layer which are the supply sources of the holes. Immediately after the bias of the antiblooming gate changes to a positive bias from a level at which the surface potential below the gate is pinned, most of the holes remain below the gate. After that, since the gate bias is high, there obtains a large fringing field between the edge of the antiblooming gate and that of the virtual gate area or that of the channel stop area. The holes remaining within the antiblooming gate area come along this field back to the channel stop area and the virtual gate area which are in the state of P+. However, since the fringing field is large, the holes become hot holes. This brings about ionization by collision. Electrons resulting from this are collected as a false signal. Hereinafter, the dark current generated by this mechanism will be called a hot hole dark current.

With the solid-state image sensor having the antiblooming gate arranged in this manner, the amount of removal of the excess electric charge and that of the false signal generation can be determined by the one cycle of a clock signal for the antiblooming gate. With the accumulating time assumed to be unvarying, the antiblooming capability and the dark current thus can be considered proportional to the clock signal frequency.

In the flash photography, the flashing time of a discharge tube (xenon discharge lamp) which is used for generation of a flash light is very short. Therefore, the quantity of light emitted during this short time is very large. Since the antiblooming capability of the solid-state image sensor provided with the antiblooming gate, as mentioned above, is determined by the excessive electric charge removing amount within such a short period of time, a clock signal of a very high frequency must be applied to the antiblooming gate in the event of flash photography. As a result, the amount of dark current increases to deteriorate the picture quality.

Further, the conventional apparatus described above is arranged to discharge the electric charge of the solid-state image sensor before the shutter begins to open. Therefore, the solid-state image sensor is in its accumulating mode for a much longer time than the flashing time actually required by the image sensor for its photoelectric converting action. Besides, this allows the image sensor to receive a light signal during a period of time other than the flashing time. The quantity of incident light other than the flash light increases with the time required between the beginning and end of the shutter opening process. This presents two problems:

A first problem resides in picture quality deterioration due to a dark current and white point flaws. The dark current and the white point flaws are undesirable for a solid-state image sensor. The dark current results from generation of electric charge due to heat or from an ionization impact due to hot holes. The former is proportional to heat and time. The latter is proportional to the number of pulses applied to the gate. The white point flaw is caused by a difference in dark current generation between picture elements. A picture element having the dark current generated to a much greater degree than others gives the white point flaw. The seriousness of these problems increases to lower the picture quality accordingly as the accumulation time increases.

A second problem lies in the incidence of light on the solid-state image sensor before and after emission of the flash light. The quantity of such light incident on the image sensor during the periods other than the flashing time becomes an error of exposure light quantity. The rate of this error varies with the brightness of the object to be photographed. For example, the incident light obtained during the non-flashing time causes a very little exposure error to allow an apposite exposure in a very dark place. In a place which is not so dark, however, the light incident on the image sensor during the non-flashing time increases to cause an over-exposure. The long exposure time extending outside the flashing time thus makes control over the exposure light quantity of the image sensor difficult. In the case of the solid-state image sensor in particular, the latitude allowed to the exposure is narrow. In view of this, a shutter is sometimes arranged to permit control over the curtain speed thereof. However, the shutter of that kind requires a longer period of time before opening it and thus the above-stated problem becomes more conspicuous.

Further, the conventional apparatus of the above-stated kind is arranged to allow the solid-state image sensor 13 to perform its accumulating action over a period of time which is determined including the delay time of the operation of the mechanical half-opening type shutter 12, the operation time difference between individual shutters resulting from varied degrees of mechanical precision, inconstancy of the operating speeds of a shutter driving motor and electromagnets due to voltage variations, etc.. As a result, the accumulating time of the image sensor 13 becomes very long.

While the solid-state image sensor 13 of the above-stated kind is known to have the drawbacks including the dark current and the white point flaw which is called a fixed pattern noise, the drawbacks increase in proportion to the accumulating time of the solid-state image sensor 13. The dark current and the white point flaws come to excessively degrade the output image of the image sensor when the amount of the electric charge exceeds a given value. Whereas, as mentioned above, the accumulating time of the solid-state image sensor is generally very long in the case of the conventional apparatus using the mechanical shutter 12. As a result, the output image either gives a coarse impression due to the dark current and the white point flaw or has white points appearing everywhere in the image to degrade the picture quality and to give a disagreeable picture.

SUMMARY OF THE INVENTION

The present invention is directed to the solution of the above-stated problems of the prior art. It is therefore a principal object of the invention to provide an image sensing apparatus which excels in antiblooming capability for the use of a flash device and produces only a small amount of dark current.

To attain this object, an image sensing apparatus arranged as an embodiment of this invention is characterized in the following points (1) and (2):

(1) The apparatus is provided with a solid-state image sensor which has an antiblooming gate and an electronic flash device. The apparatus is provided further with clock signal generating means for applying to the gate a clock signal of a given frequency during the flashing period of the flash device and a clock signal of a lower frequency than the given frequency immediately before flashing and after the completion of flashing.

(2) The frequency of the clock signal to be applied immediately before flashing and after flashing as mentioned in Point (1) above is arranged to be externally changeable from one frequency over to another.

The points (1) and (2) enable the apparatus to reduce the dark current during the non-flashing time. Further, the point (2) permits selection of a suitable clock frequency according to the purpose for which the flash device is to be used.

Further, to attain the above-stated object, an image sensing apparatus which is arranged as another embodiment of the invention is arranged to begin to apply a clock signal for antiblooming after detection of the start of movement of a shutter curtain and to change the frequency of the clock signal accordingly as the aperture diameter of the shutter varies. In other words, the apparatus is characterized in the following points:

(3) The apparatus is provided with component elements "a", "b" and "c". The element "a": A solid-state image sensor which has a gate for removal of an excess of electric charge by electron-hole recombination. The element "b": A half-opening type shutter which serves also as an iris and is provided with first signal generating means for generating an electrical signal according to the start of movement of iris forming shutter blades before the iris is opened; and second signal generating means for generating another electrical signal indicative of the aperture diameter of the iris which varies accordingly as the shutter blades move. The element "c": Clock signal applying means which is arranged to begin to apply a clock signal to the above-stated gate in accordance with the output of the first signal generating means.

(4) The apparatus is provided with clock signal frequency changing means for changing the frequency of the clock signal to be applied to the gate mentioned in Point (3) above in accordance with the output of the second signal generating means.

The points (3) and (4) effectively reduce the length of time required in applying the clock signal for antiblooming. Further, the point (4) permits selection of an optimum clock frequency for antiblooming according to the quantity of light.

It is another object of the invention to provide an image sensing apparatus which is capable of making an apposite exposure irrespectively of the brightness of the object to be photographed with a flash device used and is also capable of lessening picture quality deterioration resulting from a dark current and white point flaws.

To attain that object, an image sensing apparatus which is arranged according to this invention as an embodiment thereof comprises: a mechanical shutter; a solid-state image sensor; an electronic flash device; and electric charge ejecting means which is arranged to eject the electric charge accumulated by the solid-state image sensor after the mechanical shutter is completely opened and immediately before the flash device is allowed to flash. With the embodiment arranged in this manner, an exposure can be made almost solely with the flash illumination without being affected by the brightness of the object to be photographed by flash photography. Further, the arrangement reduces the adverse effect of a dark current.

It is a further object of the invention to provide an image sensing apparatus which is capable of giving a high quality picture by shortening the electric charge accumulating time of a solid-state image sensor to lower the level of a dark current and that of white point flaws.

To attain the above-stated object, an image sensing apparatus which embodies this invention and uses a solid-state image sensor as image input means and a mechanical shutter for adjustment of the degree of exposure is arranged as follows: The apparatus is provided with electric pulse generating means for generating an electric pulse signal according to the movement of a shutter curtain before the shutter curtain is opened. The electric charge of the solid-state image sensor is ejected immediately before the shutter opens by detecting the electric pulse signal generated according to the movement of the shutter curtain. The apparatus is further provided with storage means which is arranged to store, in a storage device interlocked with the system controller, information on a number of pulses of the electric pulse signal at which the electric charge of the solid-state image sensor is allowed to begin to be ejected.

The image sensing apparatus arranged in this manner according to the invention is capable of shortening the electric charge accumulating time of the solid-state image sensor by ejecting the electric charge of the image sensor immediately before the mechanical shutter is opened. The embodiment thus effectively prevents image deterioration due to the dark current and white point flaws to give an image of high picture quality.

It is a still further object of the invention to reduce the size and cost, with enhanced precision, of a rotary encoder included in the image sensing apparatus of the above-stated kind.

To attain this object, in the rotary encoder according to the invention, an encoder rotary plate which consists of a light-blocking part and a light-transmitting part includes a wide semi-light-transmitting part having a transmission factor intermediate between those of the light-blocking and light-transmitting parts. The semi-light-transmitting part is used for detecting a given position of the encoder rotary plate and is used as a home position, etc.. This enables the rotary encoder to be prepared in a small size, at a low cost and yet to be capable of producing a stable encode signal.

The above and other objects and features of the invention will become apparent from the following detailed description of embodiments thereof taken in conjunction with the accompanying drawings.

BRIEF DESCRIPTION OF THE DRAWINGS

FIG. 6 is a timing chart showing the operation of the first embodiment.

FIGS. 7(a) and 7(b) are timing charts showing the operation of a half-opening type shutter employed in another embodiment of the invention.

FIG. 20 shows by way of example the mechanism of a half-opening type shutter using the rotary encoder of this invention.

DETAILED DESCRIPTION OF THE PREFERRED EMBODIMENTS

Figures 1A, 1B:
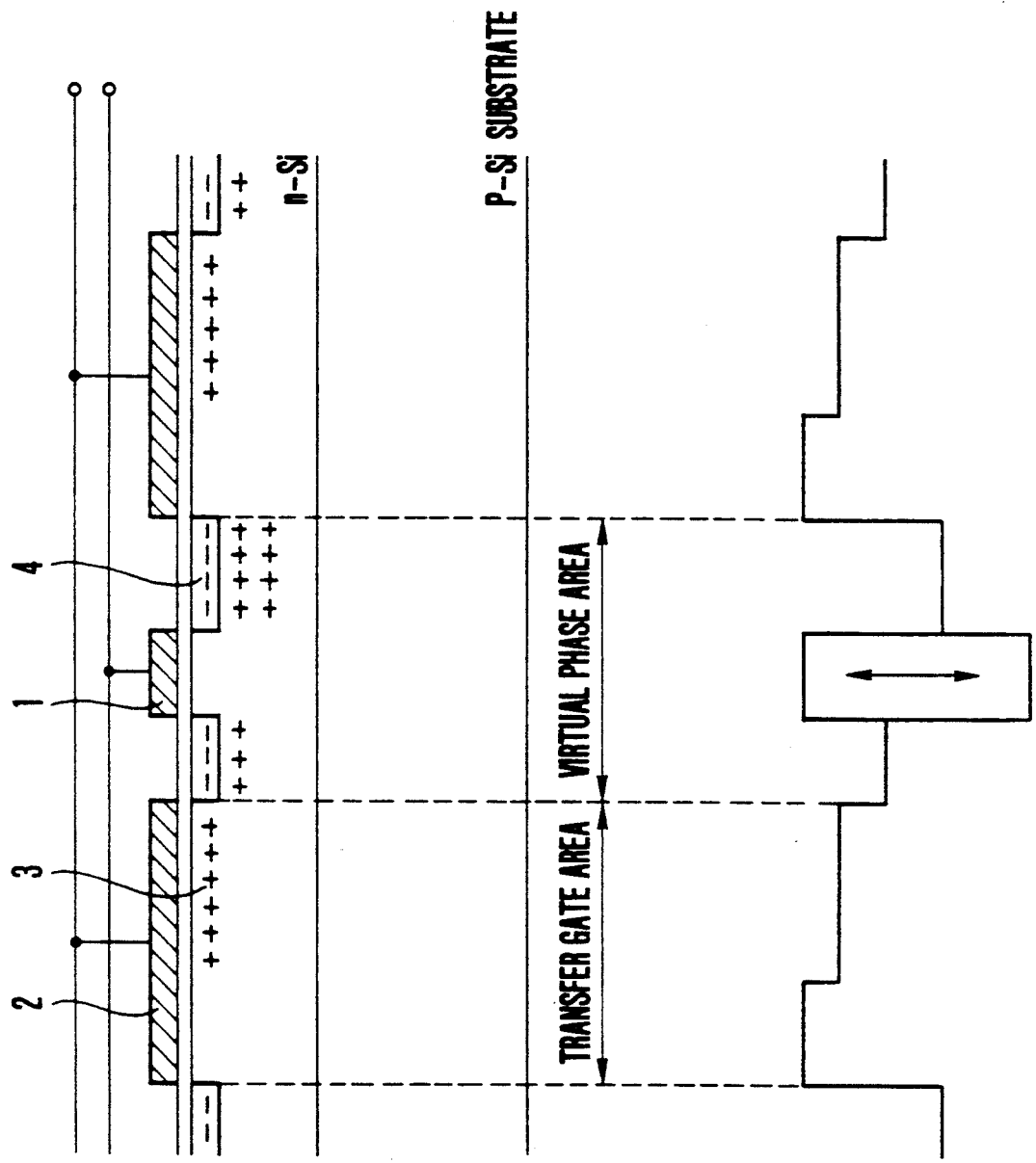
FIGS. 1(a) and 1(b) show a virtual phase CCD which has an antiblooming gate.
Figure 2:
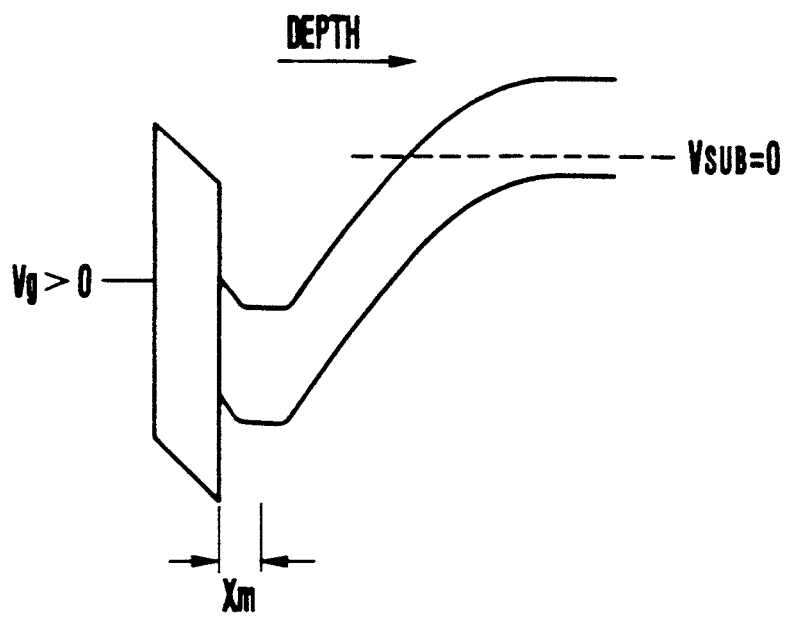
FIG. 2 shows the distribution of potential in the direction of depth below the antiblooming gate.
Figure 4:
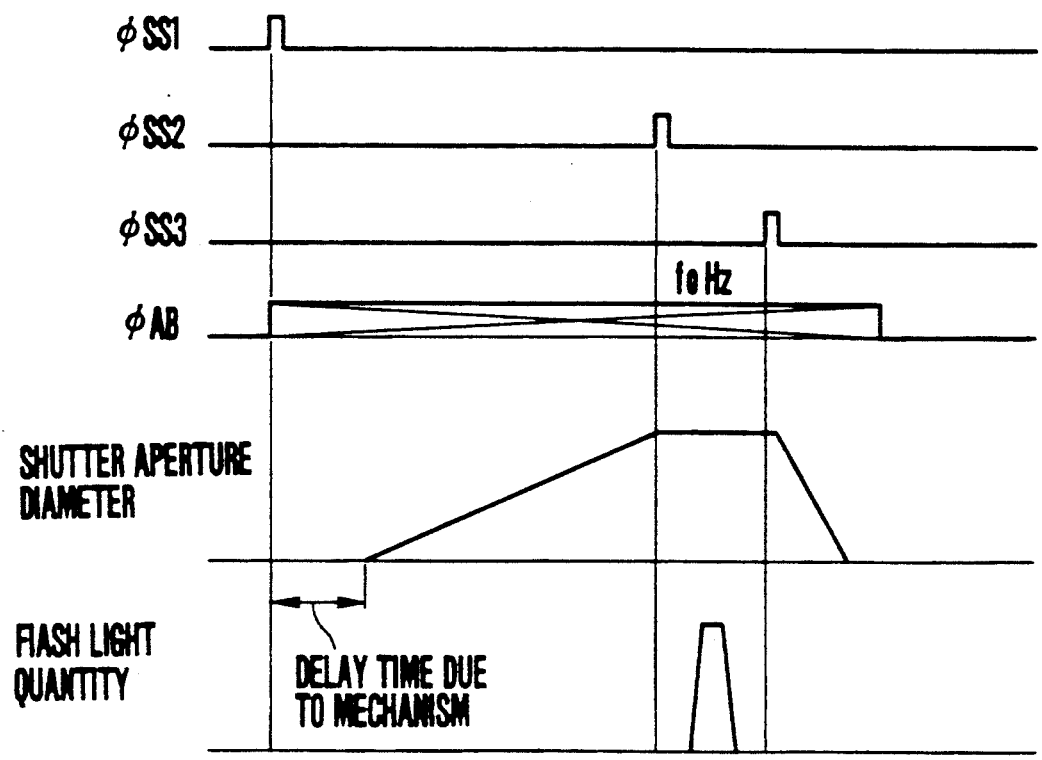
FIG. 4 is a timing chart showing the operation of the conventional electronic still video camera.
Figure 3:
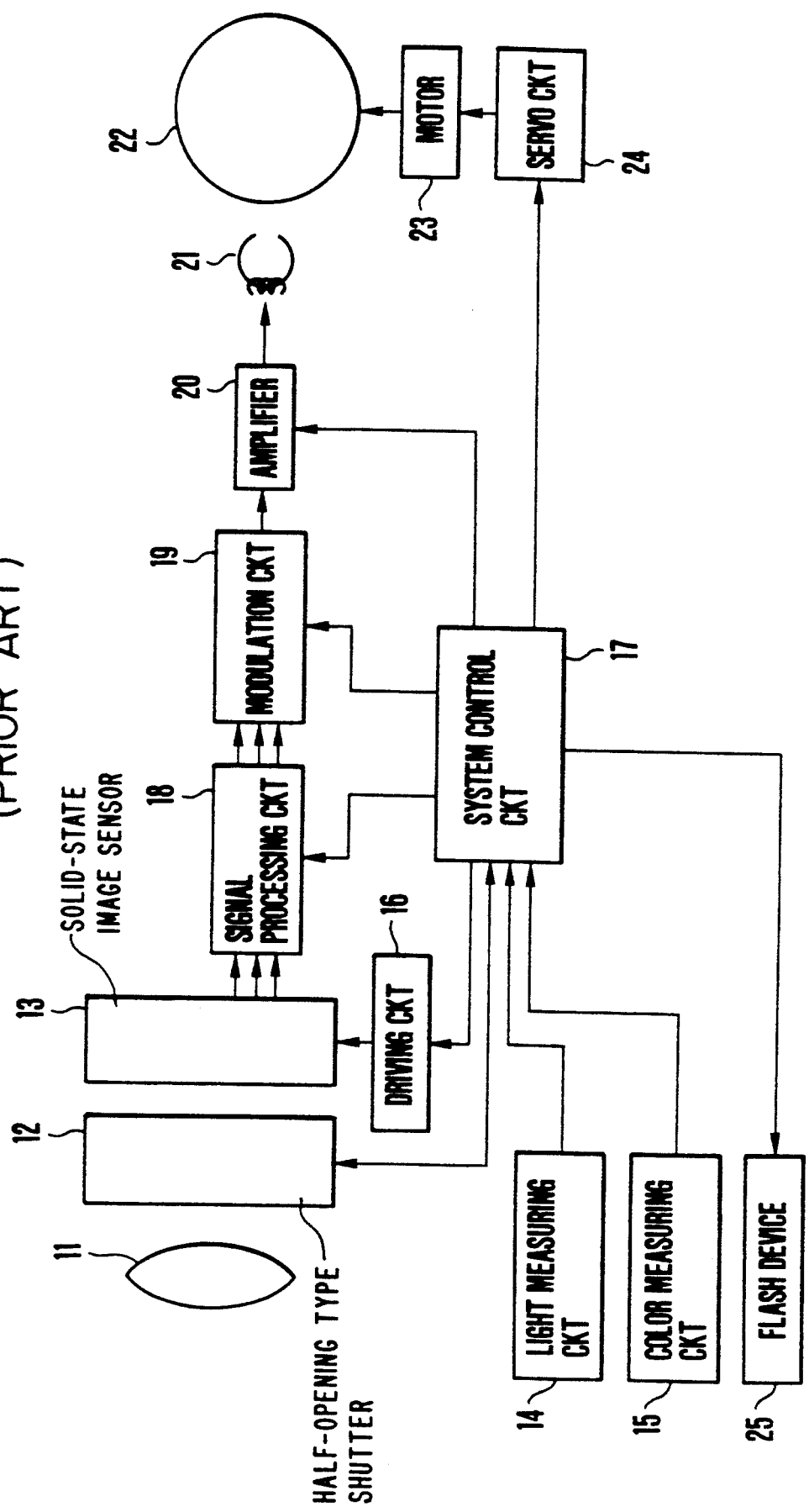
FIG. 3 is a block diagram showing the arrangement of the conventional electronic still video camera.
Figure 5:
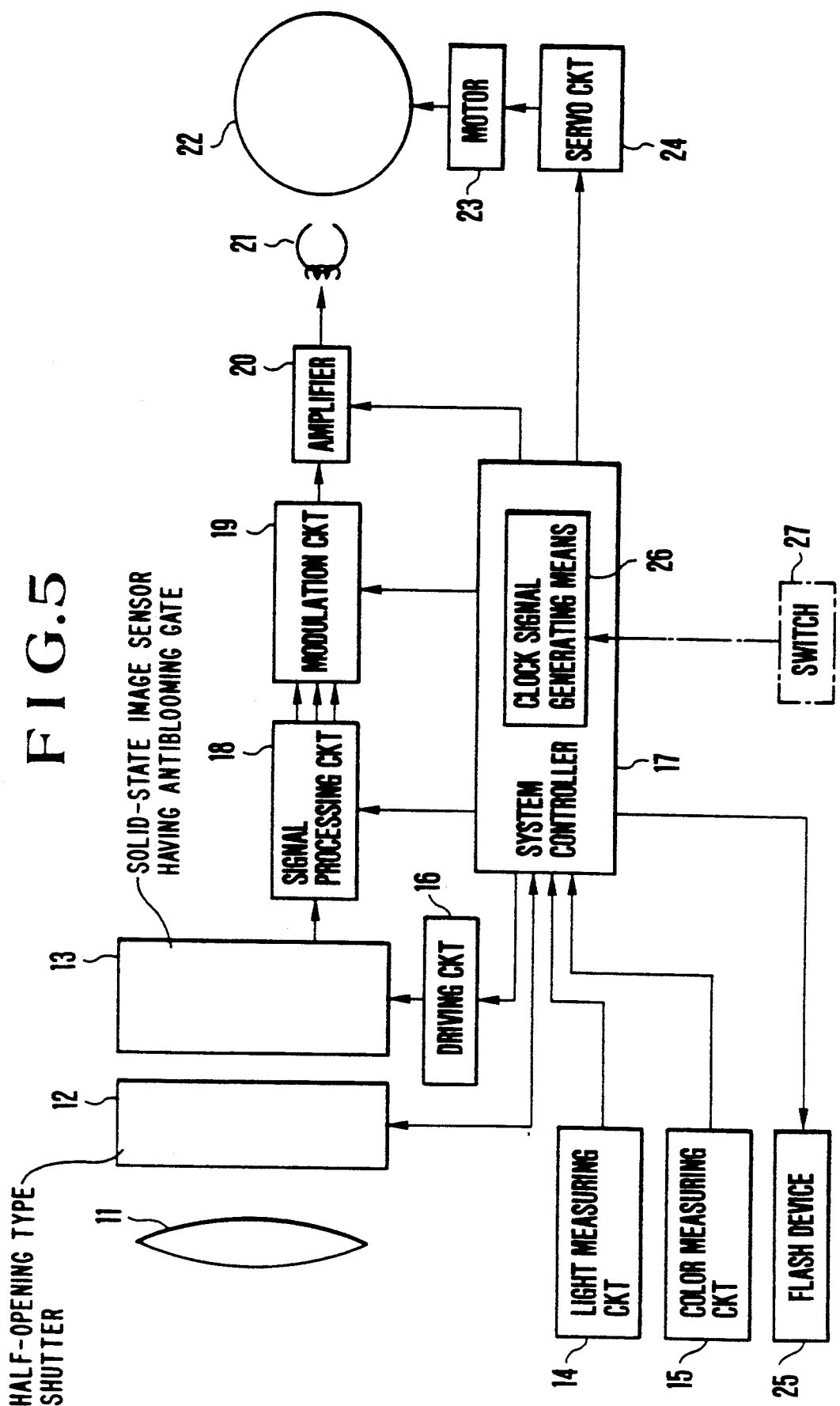
FIG. 5 is a block diagram showing the arrangement of a first embodiment of this invention.

The following describes this invention through the preferred embodiments thereof:

FIG. 5 is a block diagram showing an electronic still video camera arranged according to this invention as a first embodiment thereof. FIG. 6 is a timing chart showing the operation of the first embodiment. The first embodiment is arranged in about the same manner as the conventional electronic still video camera shown in FIG. 3. However, the first embodiment differs from the conventional still video camera in that the former is provided with a clock signal generating means 26 for generating a clock signal the frequency of which is arranged to be variable as will be described later. Therefore, the parts of the embodiment which are the same as those of the conventional still video camera are indicated by the same reference numerals.

Referring to FIG. 6, a pulse $\phi SS1$ is an instruction for opening the half-opening type shutter 12. In response to the instruction pulse, the half-opening type shutter 12 begins to operate. The shutter 12 thus begins to open to a desired aperture diameter position after the lapse of delay time of an electrical signal due to mechanical arrangement. A system controller 17 is provided with the clock signal generating means 26. The clock signal generating means 26 applies a clock signal via a driving circuit 16 to the antiblooming gate 1 of a solid-state image sensor 13. The clock signal $\phi AB$ is applied to the gate 1 either concurrently with the generation of the pulse $\phi SS1$ or after the lapse of an estimated delay time inclusive of the delay of the shutter at a low frequency f1 which is arranged to be much lower than a clock frequency f0 in such a way as to prevent an object's image from having any blooming that is caused particularly by the reflection light of a flash light when a flash device is allowed to flash. A pulse $\phi SS2$ is generated the instant the shutter 12 reaches a desired aperture diameter position. This pulse $\phi SS2$ causes the shutter 12 to stop from opening and to remain in the aperture diameter position. Further, when this pulse is produced, the clock signal generation by the clock signal generating means 26 is changed over to the generation of a clock signal of a frequency f0 Hz which prevents occurrence of blooming in the object's image caused particularly by the reflection of flash light when the flash device is allowed to flash. After completion of flashing by the flash device, another pulse $\phi SS3$ which is an instruction for closing the shutter 12 is produced. In response to the instruction pulse $\phi SS3$, the shutter 12 begins to close. The pulse $\phi SS3$ also causes the frequency of the clock signal $\phi AB$ for the antiblooming gate 1 to be changed back to the frequency f1 Hz.

The clock signal for the antiblooming gate 1 is thus arranged to be produced at a high frequency only when the flash device is allowed to flash momentarily causing a large quantity of incident light and to be normally produced at a lower frequency. This arrangement enables the embodiment to prevent deterioration of picture quality by lowering a dark current due to hot holes while ensuring the same high degree of antiblooming capability as the conventional arrangement.

A second embodiment of the invention is arranged as follows: In this case, the frequency of the clock signal to be applied to the antiblooming gate of the embodiment shown in FIG. 5 is arranged to be externally variably selectable according to the purposes for which the flash device is to be used. The flash device is used for different purposes including:

a. To illuminate an object in a dark place.

b. To correct an exposure for an object which is dark under a rear light condition.

For these two purposes, the clock signal $\phi AB$ for the antiblooming gate 1 must be applied at different frequencies. The latter requires a higher frequency.

In view of the above-stated difference, the second embodiment is provided with a switch 27 which is arranged on the outside of the apparatus to permit selection of the purpose for which the flash device is to be used. The embodiment is arranged to automatically assume the above-stated mode "a" when ambient light quantity decreases and also to enable the photographer to select the mode "b" by means of the switch 27. The frequency of the clock signal to be applied to the antiblooming gate before and after emission of a flash light is arranged to be changeable from one frequency over to another according to the purpose of use of the flash device.

As mentioned above, the second embodiment is arranged to apply the clock signal to the antiblooming gate at a high frequency only when the flash device is allowed to flash and always at a low frequency with the exception of the flashing time. This enables the embodiment to maintain a high degree of antiblooming capability with a low dark current for high picture quality.

In addition to that, the arrangement to have the frequency of the clock signal for the antiblooming gate externally variably selectable enables the embodiment to further lessen picture quality deterioration.

A third embodiment of the invention is described in the following. In this case, the invention is applied also to the camera shown in FIG. 5.

FIGS. 7(a) and 7(b) show the operation of a half-opening type shutter which serves also as an iris and is employed in the third embodiment. In FIG. 7(a), the axis of abscissa shows the length of time elapsing after commencement of the action of shutter (iris) blades. The axis of ordinate shows aperture values. A line shown in FIG. 7(a) represents the longest shutter time. Assuming that an aperture value F 5.6 gives an apposite exposure, for example, the shutter is quickly closed after arrival at F 5.6 as indicated by a broken line. FIG. 7(b) is an illustration corresponding to the axis of abscissa of FIG. 7(a). In FIG. 7(b), vertical lines represent pulses $\phi F$ of an electrical signal generated according to the action of the shutter.

Figure 8:
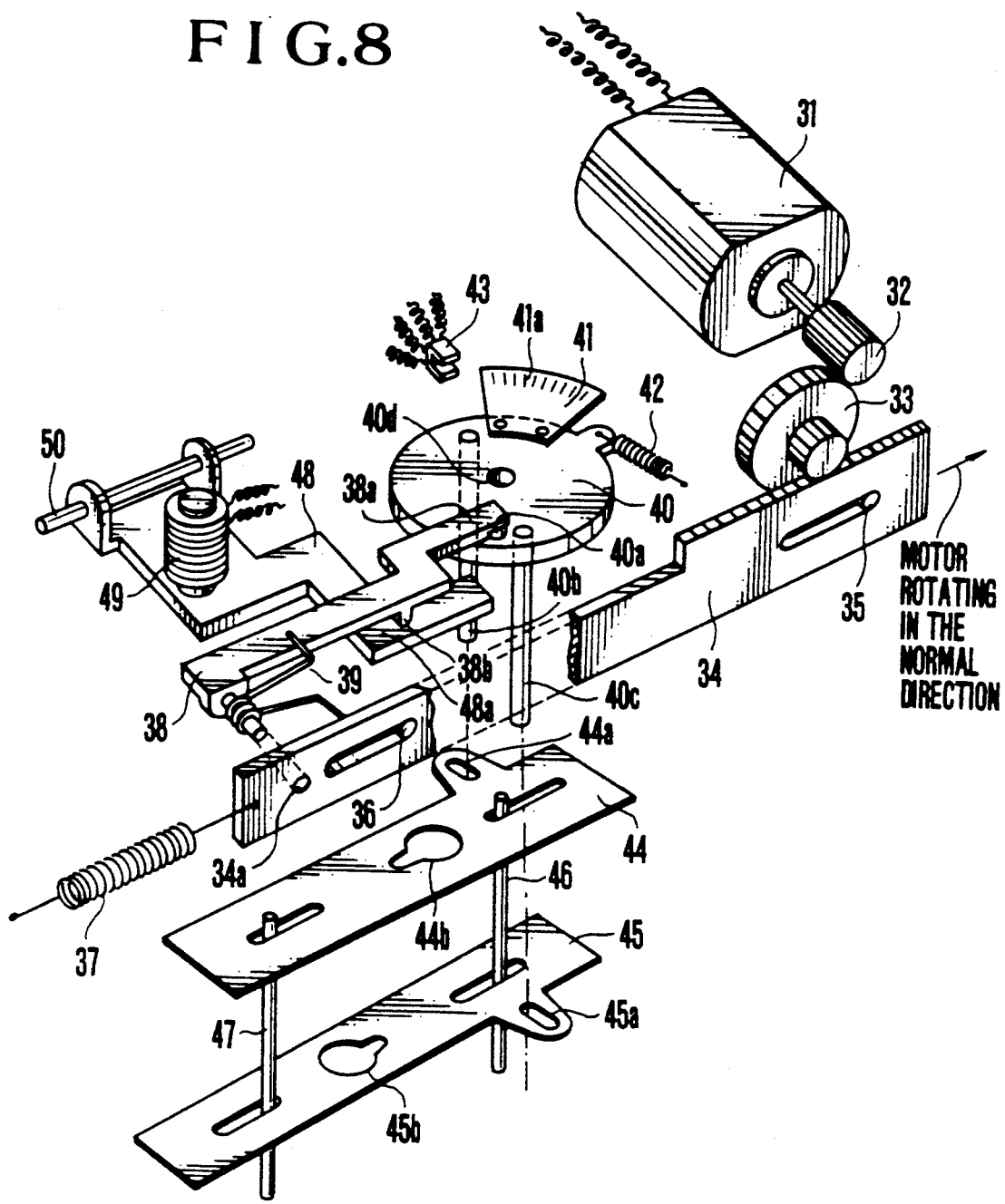
FIG. 8 is an oblique view showing the arrangement of the half-opening type shutter of the embodiment shown in FIG. 7.

Referring to FIG. 8, the mechanism and operation of the shutter and the mechanism by which the pulses $\phi F$ of the electrical signal are generated are described as follows: A motor 31 is arranged to rotate in the normal and reverse directions for driving the shutter. A gear train (32 and 33) is arranged to reduce the rotation speed of the motor 31. A rack gear 34 is arranged to move to the right as viewed on FIG. 8 when the motor 31 rotates in the normal direction and to have its moving range limited by a stopper which is not shown but is provided on a stationary part. A clutch 38 has a shaft inserted in a bearing part 34a provided in the rack gear 34 and is arranged to be turnable up and down on the shaft as viewed on FIG. 8. A spring 39 is arranged to urge the clutch 38 to move downward. A control plate 40 has a projection 40a abutting on the fore erred part 38a of the clutch 38 and is arranged to be rotatable on a bearing part 40d. A pulse plate 41 is formed in one body with the control plate 40 and has a slit part 41a which is arranged to transmit a plurality of light beams. A shutter spring 42 is arranged to urge the control plate 40 to turn to the right until it comes to abut on a stopper which is not shown. A photo-interrupter 43 is arranged to detect the slit part 41a of the pulse plate 41 and to produce a pulse when the control plate 40 rotates. Iris blades 44 and 45 are respectively provided with aperture parts 44b and 45b for adjustment of quantity of light and also with slots 44a and 45a which are arranged to permit insertion of shafts 40b and 40c protruding from the control plate 40. A shaft 46 is arranged to pierce through long slots provided in the iris blades 44 and 45 and the bearing part 40d of the control plate 40. An armature 48 is arranged to be rotatable on a rotating shaft 50 and to push the clutch 38 upward by being turned upward as viewed on FIG. 8 by the attraction of a coil 49 when the coil 49 is energized.

The third embodiment which is arranged as described above operates as follows: When a current is supplied to the motor 31 in the normal rotating direction of the motor for the operation of the shutter, the rack gear 34 is moved to the right as viewed on FIG. 8 through the gear train (32 and 33) while being guided on stationary shafts 35 and 36. The clutch 38 then moves together with the rack gear 34. The fore end part 38a comes to push out the projection 40a of the control plate 40. This allows the control plate 40 to rotate to the left on the shaft 46. The iris blade 44 is caused to be moved to the left and the blade 45 to the right by the shafts 40b and 40c protruding from the control plate 40 while being guided on the shafts 46 and 47. In this instance, the aperture parts 44b and 45b which have been in a mutually closed state come to approach to the pointed part of each other and then come to overlap each other. The quantity of light thus allowed to pass through the aperture is controlled according to the overlapped state of the aperture parts 44b and 45b. A desired aperture value is then determined by the extent to which each of the iris blades 44 and 45 is allowed to move. A relation between the length of time elapsing from the start of the shutter operation and the aperture value thus obtained is detectable through the pulses generated when the slits provided in the pulse plate 41 pass through the detection part of the photo-interrupter 43. This relation is as shown in FIGS. 7(a) and 7(b).

With the coil 49 energized for a given period of time upon detection of the number of pulses corresponding to an aperture value F 5.6, for example, that is assumed to give an apposite exposure as mentioned in the foregoing, the armature 48 is attracted to push the clutch 38 upward as shown in FIG. 8, the control plate 40 is quickly turned to the right by the shutter spring 42. The iris blades 44 and 45 are then brought back to their closed state and the shutter operation comes to an end. After that, the motor 31 is rotated in the reverse direction for a given period of time to bring the rack gear 34 and the clutch 38 back to their initial positions.

Figure 9:
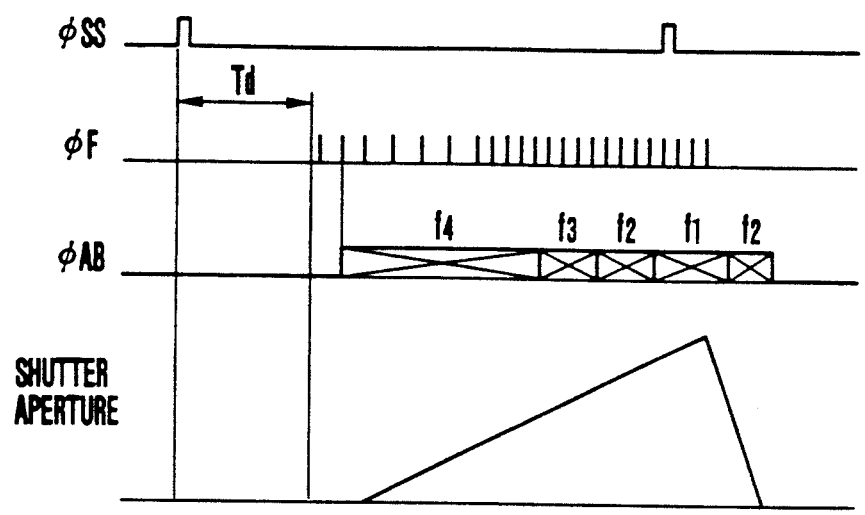
FIG. 9 is a timing chart showing the operation of the same embodiment.

FIG. 9 is a timing chart showing the operation of the third embodiment. The operation is as described below with reference to FIGS. 7(a), 7(b), 8 and 9:

Information on the luminance of the object to be photographed is supplied from a light measuring circuit 14 to the system controller 17. The system controller 17 then determines a maximum aperture value of the half-opening type shutter 12 on the basis of the information. Assuming that the aperture value is F 5.6, the embodiment further operates as follows: Referring to FIG. 9, a shutter operating instruction signal $\phi SS$ consists of a first pulse which is a shutter opening instruction and a second pulse which is a shutter closing instruction. The half-opening type shutter 12 begins to perform its mechanical operation in response to the first pulse of the pulse signal $\phi SS$. The shutter blades 44 and 45 begin to move after the lapse of a delay time Td caused by a motor, a magnet and mechanical parts. When the shutter blades 44 and 45 begin to move, the pulse plate 41 rotates. The photo-interrupter 43 then generates the pulse signal $\phi F$ as shown in FIG. 7(b). The pulse signal $\phi F$ is then supplied to the system controller 17. Upon receipt of a second pulse of the signal $\phi F$ immediately before the shutter begins to open, the system controller 17 instructs to apply the clock signal $\phi AB$ to the antiblooming gate of the solid-state image sensor 13. In this instance, the clock signal $\phi AB$ can be at a frequency f4 which is only $\frac{1}{4}$ of the frequency f2 of the clock signal $\phi AB$ produced by the conventional camera for the aperture value F 5.6.

The half-opening type shutter 12 further continues to open. Upon receipt of the eleventh pulse of the signal $\phi F$ with the aperture opened up to an aperture value F 16 which is lower by three steps than the maximum aperture, the system controller 17 produces an instruction to change the frequency of the clock signal $\phi AB$ to a frequency f3 which is two times as high as the current frequency f4. When the shutter 12 further opens up to an aperture value F 11 which is lower by two steps than the maximum aperture, that is, upon receipt of the fifteenth pulse of the signal $\phi F$, the system controller 17 instructs to change the frequency of the clock signal φAB to a frequency f2 which is twice as high as the frequency f3. When the shutter 12 comes to an aperture value F 8 which is one step lower than the maximum aperture F 5.6, the frequency of the clock signal φAB becomes a frequency f1 which is twice as high as the frequency of the clock signal φAB obtained by the conventional camera at the aperture value of F 5.6. With the shutter 12 having opened up to the aperture one step lower than the maximum aperture, the system controller 17 produces a second pulse of the signal φSS to instruct the half-opening type shutter 12 to close. Upon receipt of this instruction, the shutter 12 further opens by one step before it quickly comes to close. The frequency of the clock signal φAB is quickly changed to a frequency which is f2 or lower than f2 when the aperture of the shutter 12 is closed at least by one step from the maximum aperture. A little while after the shutter 12 has been completely closed, generation of the clock signal φAB comes to a stop. Further, the system controller 17 is provided with a clock frequency varying means for changing the frequency of the clock signal.

The third embodiment is thus arranged to give the clock signal at a frequency which is twice as high as the conventional clock (signal) frequency during the opening process between the maximum aperture and the aperture one step lower than the maximum aperture. The same clock frequency as the conventional clock frequency is given during the opening process between the aperture position between one and two steps lower than the maximum aperture. Then, the clock frequency is further decreased accordingly as the aperture diameter of the shutter further decreases. This arrangement enables the embodiment to have antiblooming capability which is nearly twice as high as that of the conventional arrangement. This is because an excess of electric charge can be removed by removing the amount of it obtained within a very short period of time. The amount of removal may be arranged to be small if the quantity of incident light within the very short period of time is small and to be large if the incident light quantity is large. The amount of removal of the excess of electric charge obtained within the very short period of time is adjustable by varying the frequency of the clock signal.

Further, the arrangement to apply the clock signal for the antiblooming gate immediately before the shutter begins to open and to lessen the clock frequency for the antiblooming gate results in a reduced amount of hot-hole dark current. The arrangement of the embodiment thus enables the image sensing apparatus to have a high antiblooming capability and a low dark current.

If the image sensing apparatus is required to reduce the dark current to a great extent while retaining the same degree of antiblooming capability, the requirement can be met by reducing to ½ each of the above-stated frequency values of the clock signal to be applied to the antiblooming gate.

In the above description, the third embodiment is assumed to have a maximum aperture set at F 5.6. In a case where the maximum aperture is F 8, the frequency of the clock signal for the antiblooming gate for the shutter opening between the maximum aperture and an aperture one step lower than the maximum aperture may be increased by two times from the value set in the case of F 5.6. Then, the frequency values for other shutter opening positions are changed accordingly.

Further, in the case of the third embodiment, the half-opening type shutter 12 is provided with the pulse plate 41 and the photo-interrupter 43. These parts are arranged to generate an electrical signal which indicates commencement of the movement of the iris blades and an electrical signal representing the iris aperture which varies with the movement of the iris blades. This arrangement, however, of course can be changed to discretely provide some other means for generating an electrical signal indicating commencement of movement of the iris blades and means for generating an electrical signal corresponding to the iris aperture.

As described above, the commencement of blade movement of the half-opening type shutter which serves also as an iris is detected. Then, immediately before the shutter begins to open, the clock signal is applied to the gate which is provided for removal of an excess of electric charge through electron-hole recombination. The early application of the clock signal enables the embodiment to generate the clock signal with a fewer number of pulses; to reduce the hot-hole dark current; and to select an optimum clock frequency according to the iris aperture. The embodiment, therefore, has a high antiblooming capability and is capable of reducing the hot-hole dark current to give an image of high quality.

Figure 10:
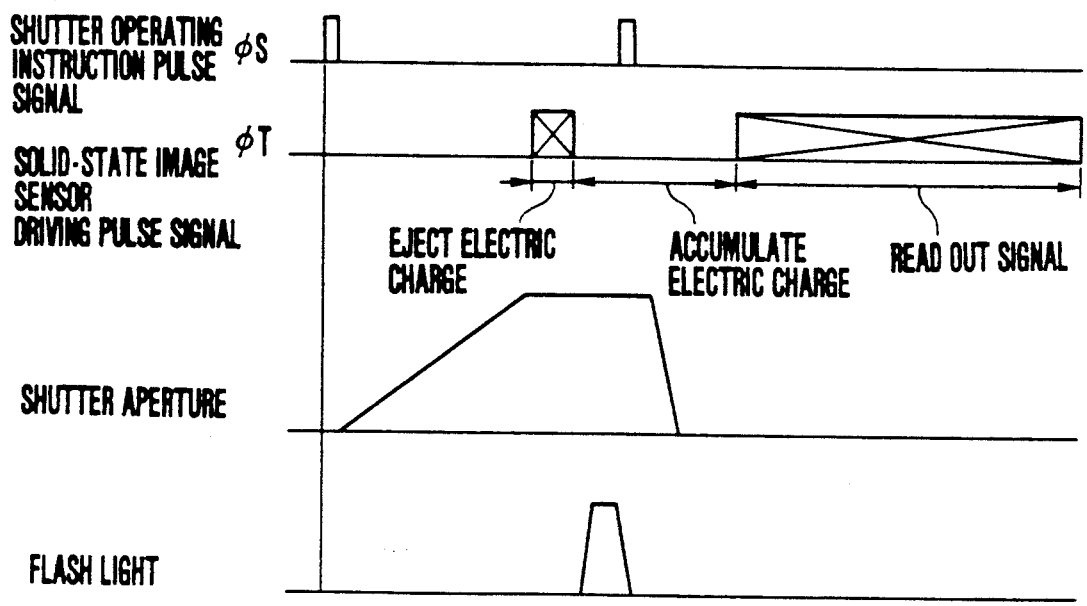
FIG. 10 is a timing chart showing the operation of a further embodiment of the invention.
Figure 11:
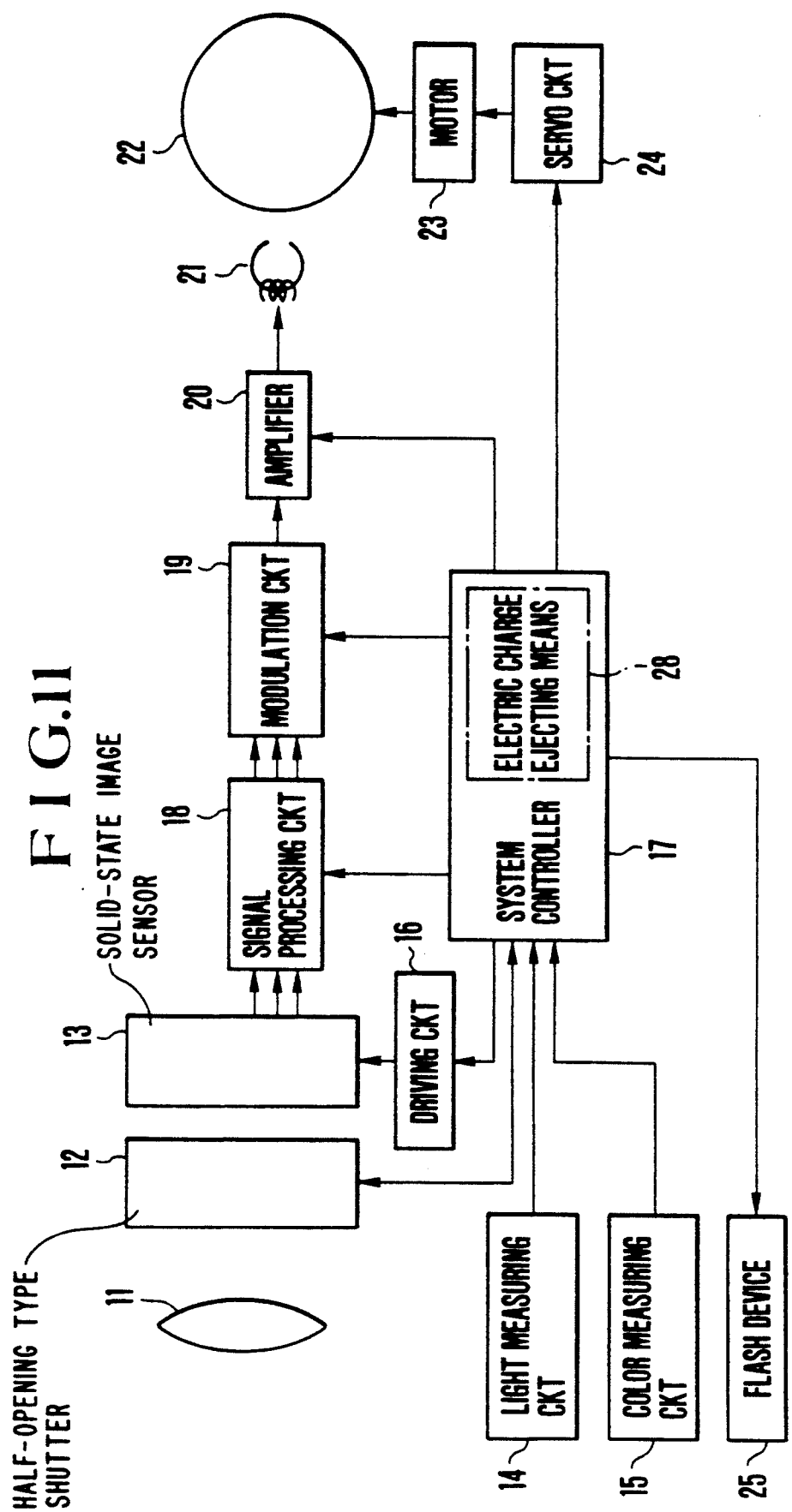
FIG. 11 is a block diagram showing in outline the arrangement of the still video camera arranged as the same embodiment.

The following describes a further embodiment of the invention: FIG. 10 is a timing chart showing the operation of a still video camera which is arranged as the embodiment. As shown in FIG. 11, the embodiment is arranged in the same manner as the preceding embodiments of the invention. However, this embodiment differs from the preceding embodiments in that the system controller 17 is provided with a means 28 for ejecting the electric charge accumulated in the solid-state image sensor 13 immediately before flashing by the flash device after the half-opening type shutter 12 is completely opened.

Referring to FIG. 10 along with FIG. 11, the embodiment is arranged as follows: A pulse signal φS consists of a first pulse which is an instruction for opening the shutter and a second pulse which is an instruction for closing the shutter. A pulse signal φT is generated for driving the solid-state image sensor.

The electric charge of the solid-state image sensor 13 is rapidly ejected after the mechanical shutter 12 has been completely opened. This ensures that the signal electric charge previously accumulated is ejected at this point of time. The signal electric charge of every picture element becomes zero. The flash device 25 flashes after completion of the ejection of the electric charge. The mechanical shutter 12 is quickly closed after completion of flashing by the flash device 25. Upon completion of closing of the shutter 12, the signal indicative of electric charge of the solid-state image sensor 13 resulting from flashing is read out from the image sensor 13.

The operation performed in this manner eliminates any component of photoelectric conversion output of the image sensor that is obtained through exposure effected prior to flashing and heretofore has caused an exposure error. In addition to that, the electric charge accumulating time of the solid-state image sensor can be greatly shortened. Further, the flash device can be arranged either within the camera or to be mounted on the outside of the camera.

As described above, the embodiment is capable of ejecting the electric charge accumulated by the solid-state image sensor immediately before flashing of the flash device. This minimizes the quantity of light incident on the image sensor during the non-flashing time, so that an apposite exposure can be attained irrespectively of the luminance of the object of flash photography. Besides, since the accumulating time of the solid-state image sensor is lessened, the picture quality deterioration due to the dark current and color flaws can be prevented. The arrangement enhances the quality of image obtained by flash photographing.

Figure 12:
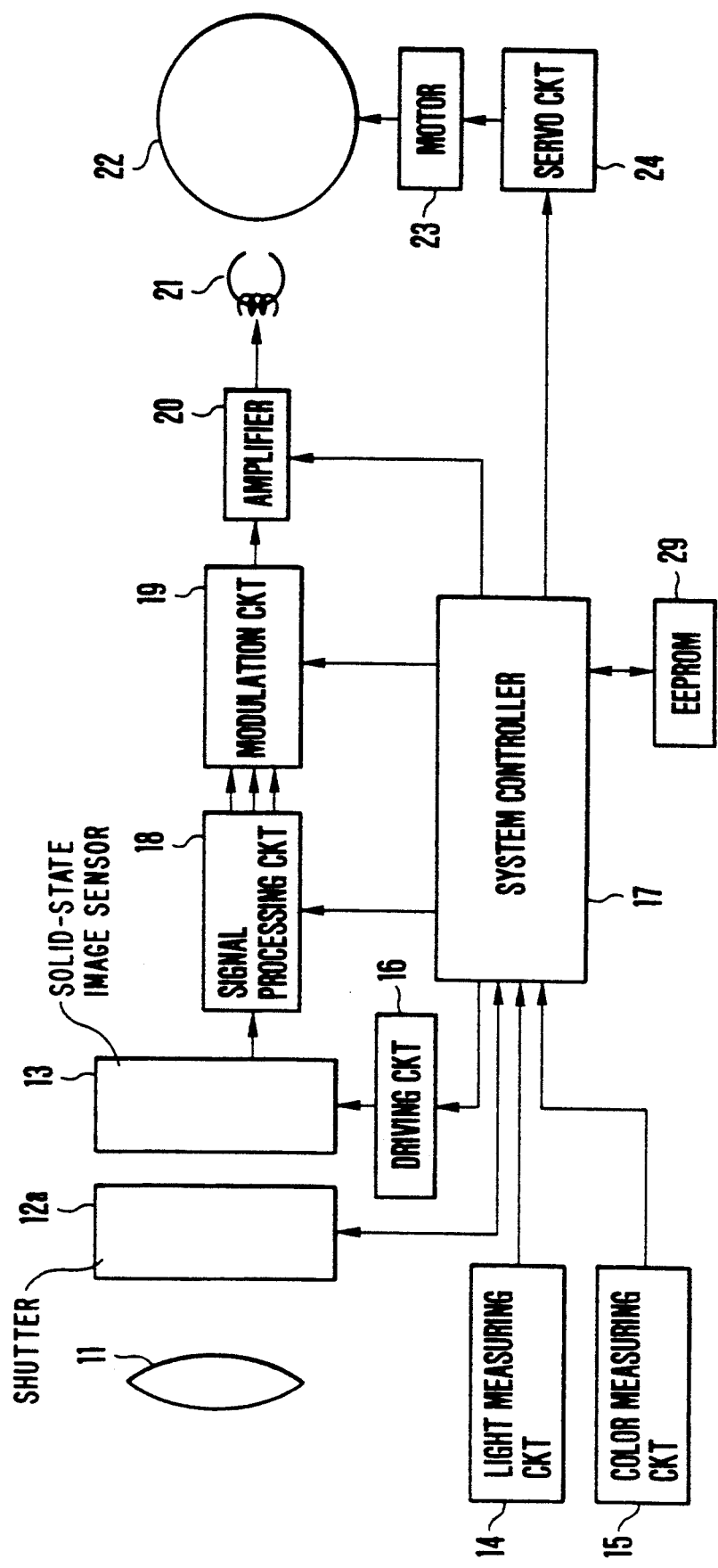
FIG. 12 is a block diagram showing the arrangement of a still video camera which is arranged as a further embodiment of the invention.

A further embodiment of the invention is described as follows: FIG. 12 is a block diagram showing the arrangement of an electronic still video camera to which this invention is applied. In FIG. 12, the component parts 11 to 24 are identical with those of the preceding embodiments. These parts include a photo-taking optical lens 11; a mechanical half-opening type shutter unit 12a which is provided with a means for generating a signal indicative of commencement of the movement of iris blades before the shutter opens and a pulse signal corresponding to the aperture of iris; a solid-state image sensor 13 which is a CCD or the like; a light measuring circuit 14 for determining an apposite exposure; a color measuring circuit 15 for determining a white balance; a driving circuit 16 for generating a gate pulse to be applied to the solid-state image sensor 13; a system controller 17 which is arranged to generate timing pulses and controls the operation of the whole camera; an image signal processing circuit 18 which is arranged to form from the signal output from the solid-state image sensor 13 color difference signals (R-Y and B-Y) and a luminance signal with a synchronizing signal (Y+-Sync); a modulation circuit 19 for frequency modulating the signals output from the image signal processing circuit 18; a recording amplifier 20 for amplifying the signal output from the modulation circuit 19; a magnetic head 21 which is arranged to electric-to-magnetic converting the signal output from the amplifier 20; a magnetic sheet (or disc) 22 on which a magnetic signal is recorded by the head 21; a motor 23 for rotating the magnetic sheet 22; and a servo circuit 24 for controlling the rotation of the motor 23. In addition to them, a storage device 29 which is an electrically erasable programmable read-only memory (hereinafter referred to as EEPROM) is arranged to store information on a prescribed number of pulses from the shutter unit 12a upon receipt of which the electric charge of the solid-state image sensor 13 is to be ejected.

Figure 13A:
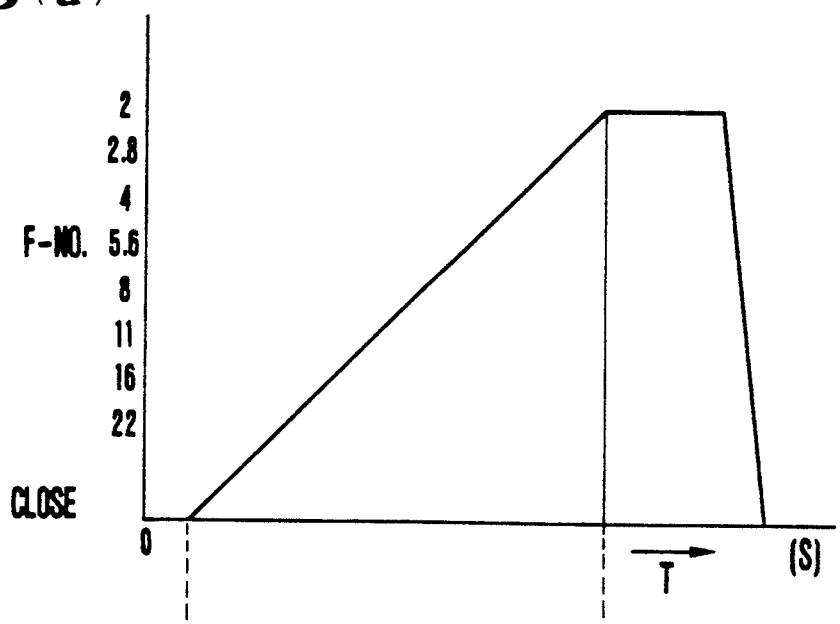
FIGS. 13(a) and 13(b) show in a timing chart by way of example the operation of the half-opening type shutter of the embodiment.
Figure 13B:
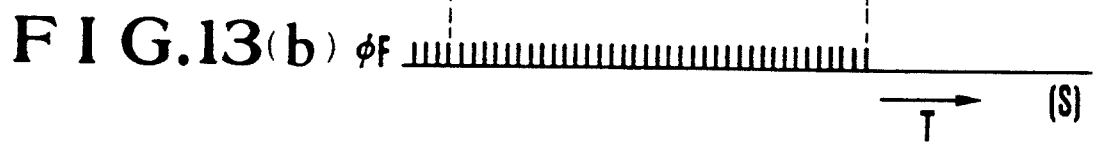

FIGS. 13(a) and 13(b) are timing charts showing the operation of the half-opening type mechanical shutter 12a included in the embodiment. The axis of abscissa shows time T (s) elapsing after the start of movement of shutter blades. The axis of ordinate shows the aperture values in F-numbers. A curve represents a shutter operation at the maximum length of shutter time. For example, with an exposure apposite to the luminance of the object assumed to be attainable at F 5.6, the shutter is rapidly closed after the aperture reaches F 5.6. FIG. 13(b) corresponds to the axis of abscissa of FIG. 13(a) and shows pulses $\phi F$ which are generated according to the shutter operation.

The structural arrangement and the operation of the half-opening type shutter 12a are identical with the shutter shown in FIG. 8.

Figure 14:
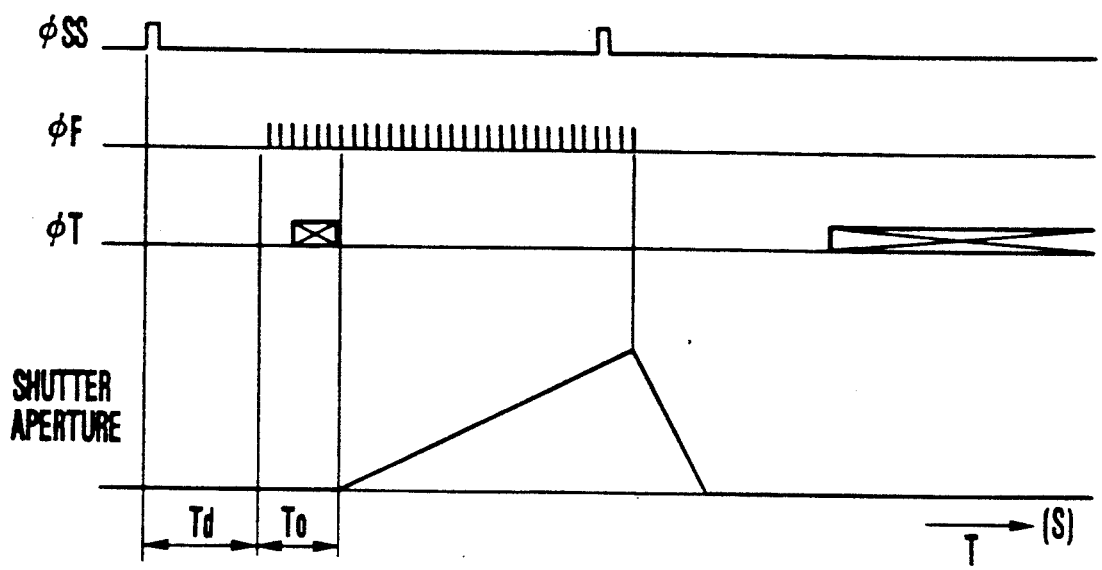
FIG. 14 is a timing chart showing the operation of the embodiment.

FIG. 14 is a timing chart showing the operation of the image sensing apparatus of this embodiment. Referring to FIG. 14 along with FIGS. 12, 13(a) and 13(b), the embodiment operates as follows: A shutter operating pulse signal $\phi SS$ consists of a first pulse which is an instruction for opening the shutter and a second pulse which is an instruction for closing the shutter. The first pulse of the signal $\phi SS$ renders the shutter mechanism operative. Then, after the lapse of a delay time Td due to the mechanical arrangement of the motor, the magnet and the gears, the shutter blades begin to move. The delay time Td varies with individual shutter products due to the uneven degrees of precision of the components parts of shutters. With the shutter blades having begun to move, the light receiving window begins to open after the lapse of a length of time To. The time To also varies with individual shutter products due to the uneven degrees of precision of the component parts of them. Therefore, the number of pulses $\phi F$ generated by the shutter varies with individual shutters manufactured.

The length of time required for ejection of the electric charge of the solid-state image sensor 13 is determined by the structural arrangement of the image sensor and does not much vary with individual products. In the case of this specific embodiment, the electric charge ejecting (removing) time required is assumed to be, for example, less than the length of time of four pulses of the pulse signal $\phi F$ generated by the shutter 12a. The shutter shown in FIG. 14 is arranged to generate seven pulses $\phi F$ before the end of the time To. The EEPROM 29 shown in FIG. 12 is arranged to store information on that the shutter 12a is to be allowed to open when the seventh pulse of the signal $\phi F$ is generated.

In a case where the shutter is arranged to open at a sixth pulse $\phi F$ instead of the seventh pulse, the EEPROM 29 is arranged to store information that the shutter opening time arrives at the sixth pulse. The system controller 17 is arranged to apply the electric charge ejecting pulse to the solid-state image sensor 13 the instant the (n-4)-th pulse of the pulse signal $\phi F$ which precedes the n-th pulse for commencement of the shutter opening action by the length of time of pulse intervals required for ejection of the electric charge of the solid-state image sensor 13 is generated by the shutter 12a.

With the camera arranged in this manner, the shutter 12a begins to open immediately after completion of ejection of the electric charge of the solid-state image sensor 13. As for the problem in respect of unevenness among the individual manufactured units of shutter 12a, the arrangement to have the prescribed number of the shutter opening pulse stored by the EEPROM 29 solves the problem, because: The ejection of the electric charge is always completed immediately before opening of the shutter. This eliminates the possibility of any error or the like that results from the ejection of the electric charge of the image sensor after commencement of opening of the shutter.

The operation ensuing the shutter opening action is performed in a known manner and is, therefore, omitted from the following description.

While the mechanical shutter of the embodiment described is of the half-opening type, the principle of this invention is likewise applicable also to a camera using a focal plane shutter.

As described in the foregoing, the embodiment is arranged to accomplish the electric charge ejecting action on the image sensor immediately before the mechanical shutter is opened. Therefore, the electric charge accumulating time of the solid-state image sensor of the image sensing apparatus using the mechanical shutter can be shortened. This lowers the levels of the dark current and the white point flaws to give an image with a high degree of picture quality.

Figure 15:
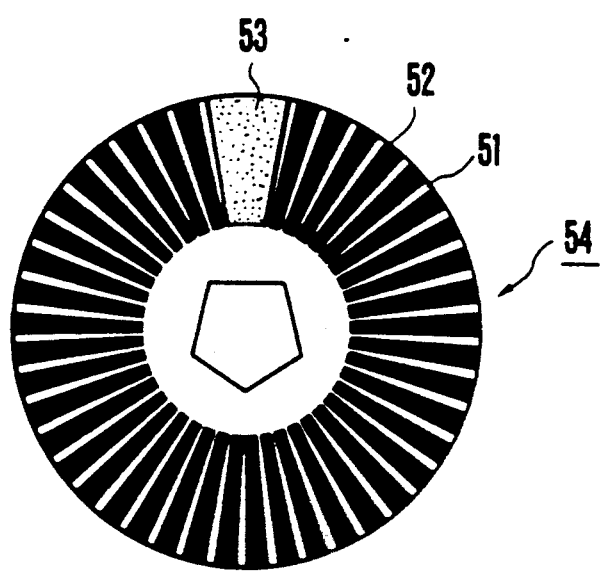
FIG. 15 shows by way of example an encoder rotary plate to be used for the rotary encoder of the invention.
Figures 16A, 16B, 16C:
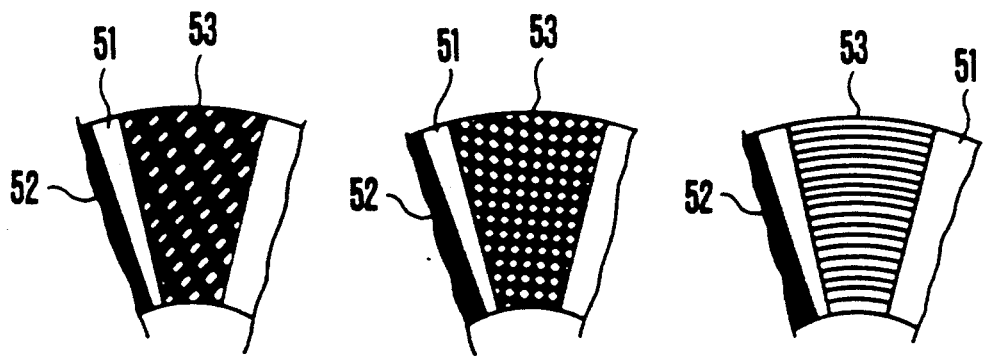
FIGS. 16(a) to 16(c) show different examples of arrangement of the semi-light-transmitting part of the encoder rotary plate.

Next, a rotary encoder which forms, for example, the pulses $\phi F$ of FIG. 14 used for control over the shutter operation of the embodiment described and a control device for controlling the shutter operation on the basis of the output of the rotary encoder are described in detail below:

FIG. 15 shows an encoder rotary plate (disc) 54 which is used for the invented rotary encoder and essentially consists of light-blocking parts and light-transmitting parts. The encoder plate 54 is made of a transparent sheet. The illustration includes the light-transmitting parts 51; the light-blocking parts 52 which are printed in black; and a semi-light-transmitting part 53 which is at an intermediate transmission level between the level of the light-transmitting parts and that of the light-blocking parts and represents a feature of the invention. FIGS. 16(a), 16(b) and 16(c) are enlarged views of the semi-light-transmitting part of FIG. 15. They show different examples of the pattern of the black print. FIG. 16(a) shows a grated pattern. FIG. 16(b) shows a checked pattern. FIG. 16(c) shows an arcuate pattern. The pattern of FIG. 16(c) is most advantageous in terms of stable signal detection as it does not have any high frequency component of a light-and-dark pattern in the rotating direction of the encoder. Since the printed patterns of FIGS. 16(a), 16(b) and 16(c) give semi-transmission characteristic in back-and-white patterns. They obviate the necessity of use of a coating material of an intermediate density.

Figure 17:
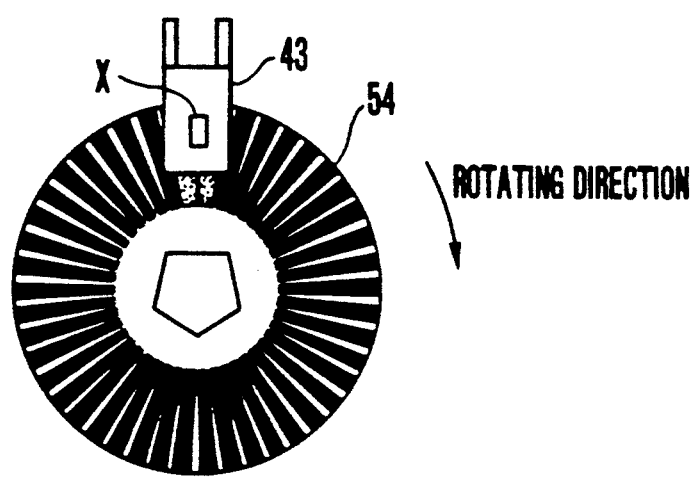
FIG. 17 shows the arrangement of a pulse detecting mechanism.
Figure 18:
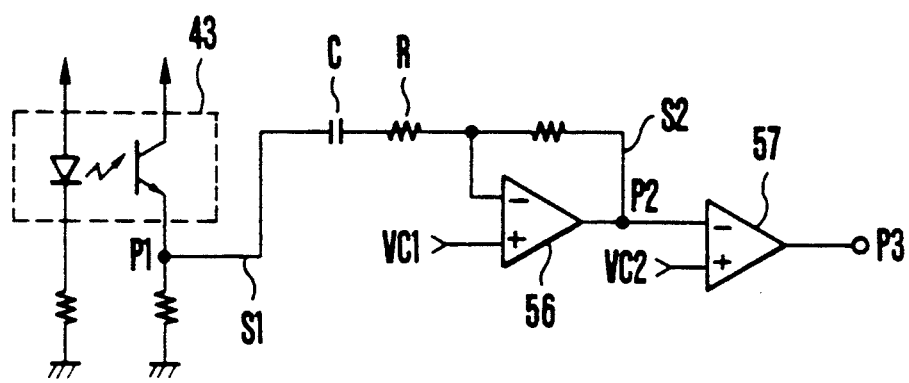
FIG. 18 shows by way of example the arrangement of an encode signal detecting circuit.

In accordance with this invention, the output of the rotary encoder is detected in a manner as described below with reference to FIGS. 17, 18, 19(a) and 19(b):

FIG. 17 shows the contrast pattern of the encoder rotary plate 54 obtained while the rotary encoder of this invention is in repose in its initial state and the positional relation of it to the photo-interrupter 43 which is used as a detection sensor. In FIG. 17, a reference symbol X indicates the actual detecting position. In the initial state, the actual detecting position X is located on the semi-light-transmitting part 53. FIG. 18 shows by way of example the arrangement of a detection circuit. FIG. 18 includes a photo-interrupter 43; an operational amplifier 56 which is arranged to AC amplify a signal P1 in conjunction with a capacitor C and a resistor R; and a comparator 57 which is arranged to compare the output of the operational amplifier 56 with a reference voltage Vc2.

Figure 19A:
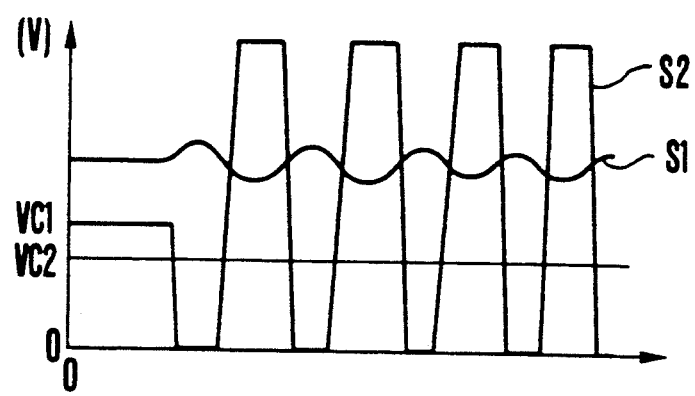
FIGS. 19(a) and 19(b) show signal wave forms obtained from a part of the circuit shown in FIG. 18.
Figure 19B:
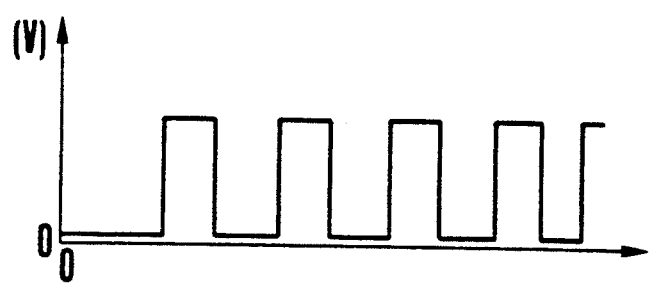

The rotary encoder operates as follows: Referring to FIG. 17, when a motor which is not shown begins to rotate, the encoder rotary plate 54 begins to rotate in the direction of an arrow. Then, at a point P1, a signal S1 which is as shown in FIG. 19(a) is produced accordingly as the encoder rotary plate 54 rotates. The signal S1 of FIG. 19(a) is AC amplified by the operational amplifier 56 of FIG. 18 and a signal S2 is produced as shown in FIG. 19(a). Further, voltages Vc1 and Vc2 shown in FIG. 18 correspond to signals Vc1 and Vc2 of FIG. 19(a). The embodiment is arranged to perform AC amplification instead of DC amplification, because: The signal S1 has a large DC component and, therefore, only the AC component of the signal S1 is extracted and amplified. Following this, the output of the operational amplifier 56 is supplied to the comparator 57 to be compared with the reference voltage Vc2. As a result, the comparator 57 produces a signal in a rectangular wave form as shown in FIG. 19(b). The encoder rotary plate 54 rotates in association with the rotation of the motor and an output signal corresponding to this can be thus obtained through the above-stated simple circuit. In this instance, if the semi-light-transmitting part 53 which is the initial position of the encoder plate 54 either completely blocks or allows light transmission, the wide width of this part might prevent the first several pulses of the contrast signal from being detected by the time constant of the capacitor C and the resistor R due to the characteristic of the AC amplification. Under such a condition, the signal detection would be impossible with the simple circuit arrangement of FIG. 18. Whereas, the provision of the semi-light-transmitting part 53 according to the invention allows accurate detection of all the pulses from the initial position to prevent a faulty action as the level of the signal S1 obtained in the initial position is at an intermediate value of the AC level. Further, additional wide semi-light-transmitting parts 53 may be arranged for detection of an intermediate position and an end position in addition to the detection of the initial position.

Figure 21:
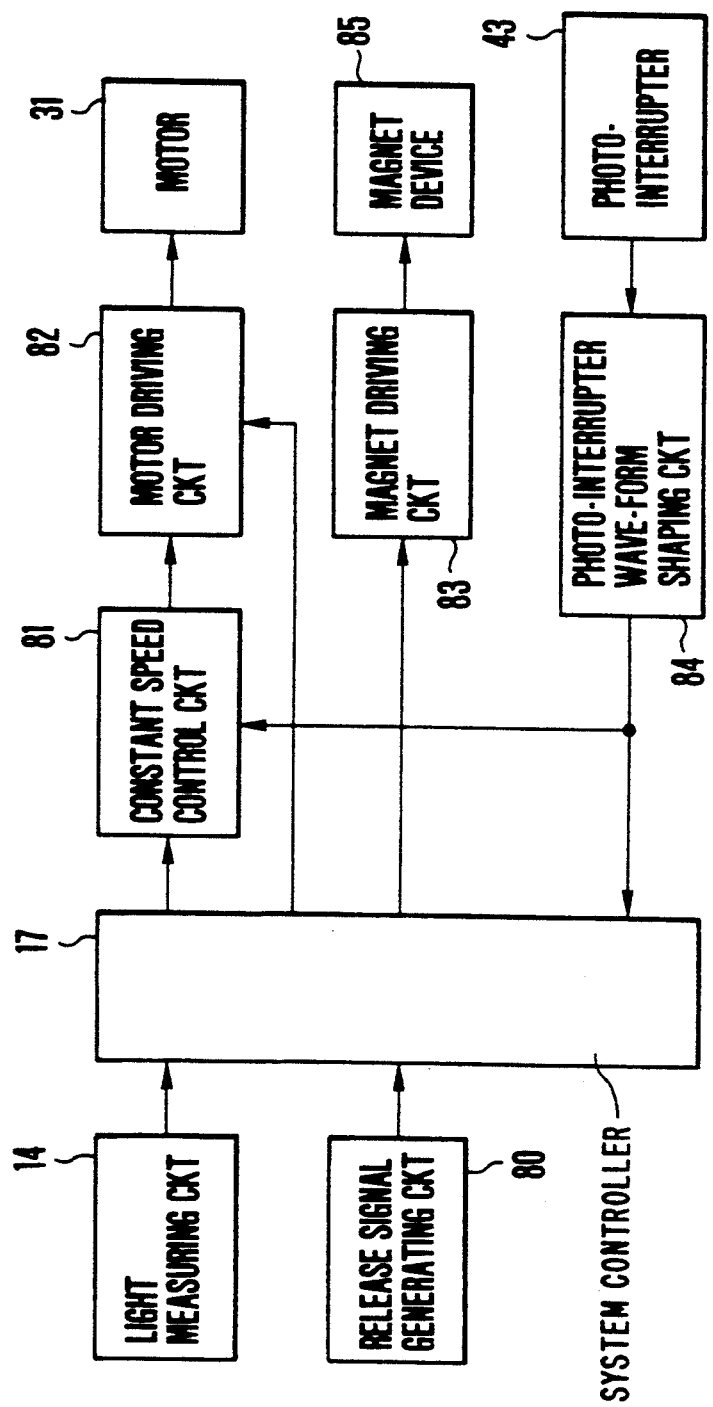
FIG. 21 is a block diagram showing the circuit arrangement of the half-opening type shutter using the invented rotary encoder.
Figure 22:
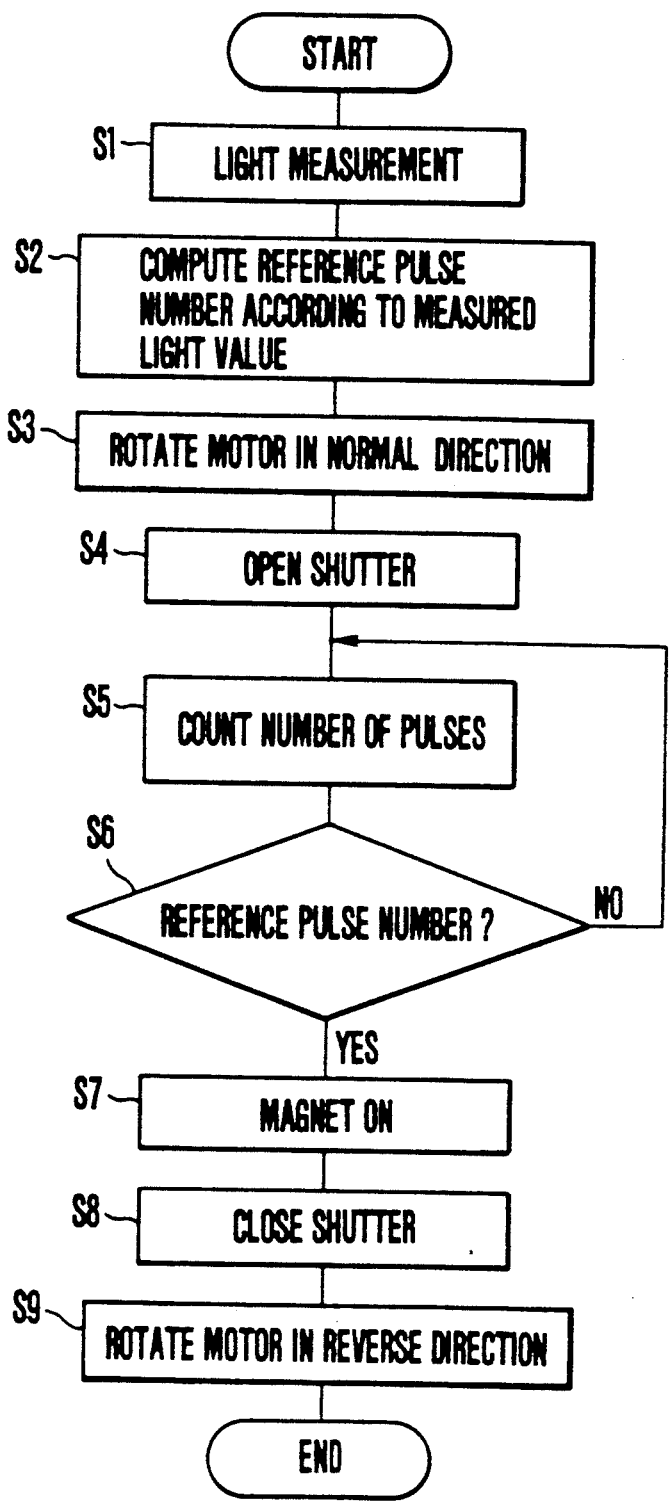
FIG. 22 is a flow chart showing the operation of the half-opening type shutter using the invented encoder.

Next, an embodiment of the invention in which the invented rotary encoder is used for control over the opening speed and the aperture of the half-opening type shutter of a camera similar to the preceding embodiments will be described below:

In the case of this embodiment, the use of the pulse plate 41 of FIG. 8 is replaced with the above-stated rotary plate 54. FIG. 20 shows the mechanical arrangement of the embodiment. FIG. 21 shows its circuit arrangement in a block diagram. FIG. 22 is a flow chart.

In FIG. 20, parts which are the same as those shown in FIG. 8 are indicated by the same reference numerals as in FIG. 8. Referring to FIG. 20, a motor 31 is arranged to open the shutter and is secured to a chassis 60. A pinion gear 32 is press fitted into the shaft of the motor 31 and is arranged to cause a rack gear 64 to slide along the shafts 61g and 61f of the chassis 60 through first and second reduction gears 62 and 63 which are fitted on the gear shafts 61a and 61b of the chassis 60. A rack spring 65 is mounted on a spring hanger 61c of the chassis 60. One end of the spring 65 is attached to a projection 61d of the chassis 60 and the other to a projection 64a provided on the rack gear 64. The spring 65 is thus arranged to push the rack gear 64 against a stopper 61e disposed on the chassis 60. A clutch 66 is provided with a shaft 67 which pierces through a hole 64b provided in the rack gear 64. A clutch spring 68 is mounted on the shaft 67 and is arranged to urge the clutch 66 to turn clockwise.

A shutter plate 69 is provided with a projection 69b and is arranged to be turned counterclockwise on a hole 69a with the projection 69b pushed by an end part 66a of the clutch 66. The peripheral part 69c of the shutter plate 69 is arranged in the form of a gear to drive the gear part of the encoder rotary plate 54. The encoder rotary plate 54 is provided with a return spring 70. A photo-interrupter 43 is arranged to read out the light-and-shade contrast pattern of the encoder rotary plate 54.

Shutter blades 44 and 45 are provided with iris forming aperture parts 44a and 45a and slots 44b and 45b. These blades 44 and 45 are driven by the projections 69d and 69e of the shutter plate 69 through these slots 44b and 45b. A suction type magnet device (73–77) includes an armature 73. When the magnet device is energized, the armature 73 is moved upward by suction.

Then an end part 73a comes to hit the projection 66b of the clutch 66 to disengage the end part 66a of the clutch 66 from the projection 69b of the shutter plate 69. The magnet device further includes an armature shaft 74; a yoke 75; a coil 76; and a coil shaft 77 which is mounted on the yoke 75 piercing through the coil 76.

Referring to FIG. 21, a light measuring circuit 14 is arranged to measure the luminance of the object to be photographed. A release signal generating circuit 80 is arranged to generate a signal by detecting a pushing operation performed on a release switch which is not shown. A system controller 17 is arranged to control the operation of the whole shutter. A constant speed control circuit 81 is arranged to perform constant speed control over the shutter opening speed on the basis of a signal from the photo-interrupter 43 which has the wave form of the output of the rotary encoder. A motor driving circuit 82 is arranged to drive the motor 31. The motor 31 is arranged to open the shutter and also to initialize the positions of the gears, etc. after the shutter is closed. A magnet driving circuit 83 is arranged to drive a clutch releasing magnet device 85 which is provided for quickly closing the shutter by means of a spring force. A photo-interrupter wave-form shaping circuit 84 is arranged to shape the wave form of the signal from the photo-interrupter 43 which is arranged to detect the signal of the encoder rotary plate 54 interlocked with a shutter opening member. The arrangement of the circuit 84 is as shown in FIG. 18.

The operation of the embodiment is described as follow with reference to FIGS. 20 to 22: When the release switch of the camera is pushed, the signal of the release signal generating circuit 80 is sent to the system controller 17. At a step S1: The system controller 17 drives the light measuring circuit 14 to detect the luminance of the object and to give luminance information, At a step S2: The controller 17 computes an apposite aperture value on the basis of the information and obtains a number of encoder pulses corresponding to the aperture value. At a step S3: The motor 31 begins to drive. The pinion 32 of the motor 31 rotates counterclockwise. The first reduction gear 62 rotates clockwise and the second reduction gear 63 counterclockwise. The rack gear 64 slides to the right along the shafts 61g and 61f of the chassis 60.

At a step S4: The clutch 66 which is attached to the rack gear 64 and is under a downward urging force of the clutch spring 68 comes to push with its end part 66a the projection 69b of the shutter plate 69. This causes the shutter plate 69 to rotate counterclockwise.

The peripheral gear part 69c of the shutter plate 69 causes the encoder rotary plate 54 to turn clockwise against the force of the spring 70. The photo-interrupter 43 then produces a pulse signal corresponding to the rotation angle of the shutter plate 69. The pulse signal has its wave form shaped by the photo-interrupter wave-form shaping circuit 84. At a step S5: The pulses of the pulse signal are counted and are supplied to the constant speed control circuit 81 to be made into a reference signal which is to be used for constant speed control. Then, at the same time, a projection 69d which is provided on the lower side of the shutter plate 69 is fitted into the slot 44b and another projection 69e into the slot 45b. The shutter plate 69 thus drives the shutter blades 44 and 45 to have an exposure effected through the aperture (opening) parts 44a and 45a.

The pulse counted number from the photo-interrupter 43 increases and the aperture parts 44a and 45a gradually open accordingly as the shutter plate 69 turns counterclockwise. At a step S6: A check is made to see if the pulse counted number has reached the reference pulse number computed at the step S2 according to the measured luminance of the object. When the pulse counted number is found to have reached the reference number, the flow of operation comes to a step S7. At the step S7: A current is supplied to the coil 76 of the magnet device 85. The armature 73 is then moved upward by suction The end part 73a of the armature 73 pushes the projection 66b of the clutch 66 upward to disengage the end part 66a of the clutch 66 from the projection 69b of the shutter plate 69.

At a step S8: Then, the return spring 70 comes to quickly return the shutter plate 69 in the clockwise direction. The aperture (opening) part of the blades 44 and 45 is closed. After that, the current supply to the magnet device is cut off. With the shutter thus closed, the flow comes to a step S9.

Step S9: A current is supplied to the motor 31 in the reverse direction. This causes, through the pinion 32, the first reduction gear 62 and the second reduction gear 63, the rack gear 64 to slide back to the left. The rack gear 64 is eventually brought back to its initial position with the end part 66a of the clutch 66 again engaging the projection 69b of the shutter plate 69.

In accordance with this invention, as described in the foregoing, the rotary encoder which controls the rotating speed and the position of the motor is provided with the wide semi-light-transmitting part which is included in the encoder rotary plate and has an intermediate transmission factor between those of the light-blocking part and the light-transmitting part of the rotary plate. This semi-light-transmitting part is used as a home position in detecting a given position of the rotary plate. This arrangement enables a compact and low-cost camera to obtain a wide and stable encoded signal with a simple detection circuit. This encoder permits accurate control over the rotating speed and position of the motor 31 in driving the shutter blades 44 and 45. Therefore, the operation of the shutter can be controlled with a high degree of precision.

What is claimed is:

1. A rotary encoder for detecting a rotating position of a motor, comprising:
    an encoder rotary plate including a light-blocking part, a light-transmitting part, a semi-light-transmitting part which has an intermediate transmission factor between transmission factors of said light-blocking part and said light-transmitting part;
    detecting means for detecting a rotating position of said encoder rotary plate based on said light-blocking part, said light-transmitting part and said semi-light-transmitting part;
    exposure means for controlling an exposure condition of a photoconverting member according to an output of said detecting means; and
    control means for varying a photoconversion characteristic of said photoconverting member depending on the output of said detecting means.

2. A rotary encoder according to claim 1, wherein the exposure means controls at least one of an opening speed of shutter blades of a half-opening type shutter and an aperture of said shutter.

3. An encoder according to claim 1, wherein said semi-light-transmitting part has a printed light-blocking pattern or a printed light-transmitting pattern which is printed in a grated shape, a checked shape or an arcuate shape.

4. An encoder according to claim 1, wherein said semi-light-transmitting part sets an initial position.

5. An encoder according to claim 1, wherein said exposure means includes a shutter.

6. An encoder according to claim 1, wherein said control means is arranged to vary said photoconversion characteristic of said photoconverting member by varying a drive frequency of said photoconverting member.

7. An encoder according to claim 6, wherein said drive frequency is a frequency of a drive signal for eliminating an unnecessary charge in said photoconverting member.

* * * * *